United States Patent
Greenspan et al.

(10) Patent No.: US 11,307,021 B2
(45) Date of Patent: Apr. 19, 2022

(54) METHOD AND APPARATUS FOR INDOOR POSITIONING

(71) Applicant: Six Degrees Space Ltd, Jerusalem (IL)

(72) Inventors: Daniel Greenspan, Jerusalem (IL); Klonymus Sholom Lieberman, Jerusalem (IL)

(73) Assignee: Six Degrees Space Ltd, Jerusalem (IL)

( * ) Notice: Subject to any disclaimer, the term of this patent is extended or adjusted under 35 U.S.C. 154(b) by 0 days.

(21) Appl. No.: 16/896,273

(22) Filed: Jun. 9, 2020

(65) Prior Publication Data

US 2020/0300612 A1    Sep. 24, 2020

Related U.S. Application Data

(63) Continuation of application No. 15/782,474, filed on Oct. 12, 2017, now Pat. No. 10,718,603.

(60) Provisional application No. 62/407,636, filed on Oct. 13, 2016, provisional application No. 62/452,383, (Continued)

(51) Int. Cl.
| | |
|---|---|
| *G01B 11/14* | (2006.01) |
| *G01B 11/00* | (2006.01) |
| *G06F 3/01* | (2006.01) |
| *H04N 5/341* | (2011.01) |
| *H04N 5/33* | (2006.01) |

(52) U.S. Cl.
CPC .......... *G01B 11/14* (2013.01); *G01B 11/002* (2013.01); *G06F 3/011* (2013.01); *H04N 5/341* (2013.01); *H04N 5/33* (2013.01)

(58) Field of Classification Search
CPC .................................................. G01B 11/14
USPC ......................................................... 348/143
See application file for complete search history.

(56) References Cited

U.S. PATENT DOCUMENTS

| | | |
|---|---|---|
| 4,923,303 A | 5/1990 | Lutz |
| 4,973,156 A | 11/1990 | Dainis |
| (Continued) | | |

FOREIGN PATENT DOCUMENTS

| | | |
|---|---|---|
| WO | 1996035960 A1 | 11/1996 |
| WO | 2006047487 A2 | 5/2006 |
| WO | 2016008513 A1 | 1/2016 |

OTHER PUBLICATIONS

International Search Report for corresponding PCT application PCT/IB2017/056328 dated Feb. 12, 2018.
(Continued)

*Primary Examiner* — Daniel T Tekle
(74) *Attorney, Agent, or Firm* — Heidi Brun Associates Ltd.

(57) ABSTRACT

A positioning unit mountable on a moving object includes at least one light source measuring unit and a processor. The light source measuring units have high directional sensitivity along a first axis and low directional sensitivity along a second axis orthogonal to the first axis to capture relative angular information of the moving object with respect to a plurality of simultaneously active stationary light sources located at multiple locations in a space. The processor determines positioning information of the moving object at least from the output of the at least one light source measuring unit. Each light source measuring unit includes an optical arrangement and a linearly configured imaging sensor to receive light from the stationary light sources through the optical arrangement.

36 Claims, 16 Drawing Sheets

Related U.S. Application Data filed on Jan. 31, 2017, provisional application No. 62/525,220, filed on Jun. 27, 2017.

(56) References Cited

U.S. PATENT DOCUMENTS

| | | | | |
|---|---|---|---|---|
| 6,023,330 | A * | 2/2000 | Marshall | G01J 3/02 |
| | | | | 356/328 |
| 6,324,296 | B1 | 11/2001 | McSheery | |
| 6,710,767 | B1 | 3/2004 | Hasegawa | |
| 8,310,537 | B2 | 10/2012 | Marti | |
| 2003/0083844 | A1 | 5/2003 | Reddi | |
| 2005/0051860 | A1 * | 3/2005 | Takeuchi | H01L 27/14843 |
| | | | | 257/436 |
| 2005/0213109 | A1 | 9/2005 | Schell | |
| 2011/0043806 | A1 | 2/2011 | Guetta | |
| 2011/0163166 | A1 | 7/2011 | Wang | |
| 2014/0097329 | A1 | 4/2014 | Wadsworth | |
| 2014/0295878 | A1 * | 10/2014 | Yang | H04W 4/33 |
| | | | | 455/456.1 |
| 2014/0375982 | A1 * | 12/2014 | Jovicic | G01C 21/00 |
| | | | | 356/72 |
| 2015/0179830 | A1 * | 6/2015 | Sugiura | G01J 1/06 |
| | | | | 257/432 |
| 2016/0084960 | A1 | 3/2016 | Harrison | |
| 2016/0139232 | A1 * | 5/2016 | Gan | H04N 7/183 |
| | | | | 398/127 |

OTHER PUBLICATIONS

Liu, Haiqing et al, "Precise calibration of linear camera equipped with cylindrical lenses using a radial basis function-based mapping technique", Optics Express 23(3):3412 Feb. 4, 2015.

Durlach, Nathaniel I. et al., Editors,. "Virtual Reality: Scientific and Technological Challenges", National Research Council, Committee on Virtual Reality Research and Development, 1995.

Chatterjee, Ishan,. "Ultrafast Tracking with Hardware ROI on CMOS Sensor", [online] [retrieved on Dec. 26, 2017] Retrieved from the Internet: <URL:http://ishanchatterjee.weebly.com/ultrafast-tracking-with-hardware-roi-on-cmos-sensor.html.

* cited by examiner

METHOD AND APPARATUS FOR INDOOR POSITIONING

CROSS REFERENCE TO RELATED APPLICATIONS

This application is a continuation application of U.S. patent application Ser. No. 15/782,474, filed Oct. 12, 2017, which claims priority from U.S. provisional patent applications 62/407,636, filed Oct. 13, 2016, 62/452,383, filed Jan. 31, 2017, and 62/525,220, filed Jun. 27, 2017, all of which are incorporated herein by reference.

FIELD OF THE INVENTION

The present invention relates to indoor positioning systems generally and to beacon-based indoor positioning systems, in particular.

BACKGROUND OF THE INVENTION

Indoor positioning systems (IPS) enable the location of an object to be identified within an indoor location. In some cases, the object may determine its location in relation to reference points, and in other cases, systems external to the object determine the location of the object.

There exist a wide range of technologies for IPS, including physical sensing, magnetic sensing, and use of audio waves or electro-magnetic waves (including technologies using human-visible light and technologies using non-human-visible light). IPS technologies may also be classified according to whether the positioning system is 'active', 'passive', or 'active passive'.

In an 'active' system, one or more elements of the system send out reference signals which are received by one or more other elements of the system. For example, one type of active system has Bluetooth beacons which send out reference signals that are detected by nearby smartphones.

An active-passive system (or a 'reflective' system) has one element of the system which emits a reference signal that may be reflected by other elements of the system (in a passive manner) or by elements of the indoor environment. An exemplary active-passive system is a system that uses acoustic range-finding to measure the time of flight of an emitted acoustic wave that bounces off (echoes from) solid objects of the indoor environment.

Another system uses human-visible light waves for indoor positioning. Such systems invariably use a form of Visible Light Communication (VLC) to convey details that allow an electronic receiver to determine its own location. In such systems, light fixtures may be modified such that the visible light they emit contains a modulation of additional information such as the light's physical coordinates or a serial number. The modulation is typically sufficiently rapid so as not to be noticeable by the human eye. More advanced systems allow the approximate location of the receiver within the room to be determined by measuring the relative intensity of the modulated light beams from multiple fixtures.

Similarly, in active technologies using non-human visible light such as infra-red, there is a modulation of the light source to allow positional information to be determined. One particularly successful such coding scheme, as implemented in the "Lighthouse" system of the HTC Vive, involves the high-speed sweeping of fans of infra-red light across a room, thus providing an encoding of beam position as a function of time. This allows a receiving device to determine its position by considering the time of arrival of such beams relative to a reference pulse of light.

Some passive technologies utilize human-visible light and non-human-visible light. Such technologies are generally constructed around the principles of using some form of camera to capture images of the device's surroundings and of extrapolating the camera's position from those images, and from past calibrations. Multiple cameras may be used to give additional images and allow triangulation. High-resolution cameras (such as 8 megapixel) may be used to improve accuracy. The computational requirements for performing such extrapolations are significant, and heavily impact the cost, power, and accuracy of such systems.

Without camera and computation, a passive system using light may be limited to basic measurements, such as estimating the distance the receiver has travelled down a corridor by detecting proximity to ceiling lights by measuring overall light level, and counting the number light level fluctuations that had been experienced.

PR (Passive Infra-Red) detectors have sensors with two cells, and focus infra-red light waves from different areas of the 'scene' onto cells alternatively, in order to detect movement of warm objects in the scene.

Beacon-based systems (i.e. systems which install beacons to provide a pre-defined light source) offer the best performance, but the installation of beacons is a key disincentive to user adoption in terms of inconvenience and cost.

The following documents discuss various systems to measure positions of optical targets: U.S. Pat. Nos. 6,324,296, 4,973,156 and US 2003/0083844.

SUMMARY OF THE PRESENT INVENTION

There is provided, in accordance with a preferred embodiment of the present invention, a positioning unit mountable on a moving object which includes at least one light source measuring unit and a processor. The light source measuring units have high directional sensitivity along a first axis and low directional sensitivity along a second axis orthogonal to the first axis to capture relative angular information of the moving object with respect to a plurality of simultaneously active stationary light sources located at multiple locations in a space. The processor determines positioning information of the moving object at least from the output of the at least one light source measuring unit. Each light source measuring unit includes an optical arrangement and a linearly configured imaging sensor aligned along the first axis to receive light from the stationary light sources through the optical arrangement.

Moreover, in accordance with a preferred embodiment of the present invention, the moving object is a human head, the unit is implemented on a headset and the processor determines at least one axis of orientation of the headset.

Alternatively, in accordance with a preferred embodiment of the present invention, the unit is implemented on a headset and the processor determines position of the headset.

Further, in accordance with a preferred embodiment of the present invention, the unit also includes an accelerometer, a gyroscope, and/or a magnetometer providing input into the processor.

Still further, in accordance with a preferred embodiment of the present invention, the processor includes a unit to output the positioning information to a simultaneous localization and mapping (SLAM) unit.

Moreover, in accordance with a preferred embodiment of the present invention, the stationary light sources include a light bulb, daylight through a window, a lamp, an LED and/or an infra-red light source.

Further, in accordance with a preferred embodiment of the present invention, the optical arrangement has the high directional sensitivity along a first axis and low directional sensitivity along a second axis orthogonal to the first axis.

Still further, in accordance with a preferred embodiment of the present invention, the optical arrangement includes an enclosure for the imaging sensor. The enclosure has at least one slit in one wall thereof with the sensor mounted opposite to the at least one slit and receiving light therefrom.

Further, in accordance with a preferred embodiment of the present invention, the wall is curved and the at least one slit is formed within the curved wall. Alternatively, there are three or more slits. Further alternatively, one of the slits is formed on an angle to a symmetrical axis of the sensor.

Further, in accordance with a preferred embodiment of the present invention, the optical arrangement also includes a lens incorporated into at least one of the at least one slits.

Additionally, in accordance with a preferred embodiment of the present invention, the moving object is a robot, a drone, a toy and/or a vehicle.

Moreover, in accordance with a preferred embodiment of the present invention, the optical arrangement includes a lens incorporated into at least one of the slits.

Further, in accordance with a preferred embodiment of the present invention, the imaging sensor is a linear sensor or a two-dimensional sensor.

Still further, in accordance with a preferred embodiment of the present invention, the imaging sensor has low sensitivity to received light.

Moreover, in accordance with a preferred embodiment of the present invention, the processor tracks bright spots on the imaging sensor related to the stationary light sources.

Additionally, in accordance with a preferred embodiment of the present invention, the processor tracks peaks in output of the imaging sensor related to vertical features in the space.

Alternatively, in accordance with a preferred embodiment of the present invention, the imaging sensor is a two-dimensional image sensor having rows and columns of image cells and the measuring unit includes a summing unit which generates summed columns of the image sensor to generate a representation of the scene having high directional sensitivity along a first axis and low directional sensitivity along a second axis orthogonal to the first axis.

Further, in accordance with a preferred embodiment of the present invention, the summing unit is a full frame readout and summing circuitry to sum columns of the image sensor.

Still further, in accordance with a preferred embodiment of the present invention, the imaging sensor includes a two-dimensional image sensor and a key row analyzer to select rows of the sensor having high contrast.

Further, in accordance with a preferred embodiment of the present invention, the key row analyzer includes a high contrast feature extractor, a key row determiner and a key row readout unit. The extractor determines high contrast features of the scene. The determiner determines key rows. The key rows have the high contrast features. The key row readout unit reads out the key rows as the scene representation.

There is also provided, in accordance with a preferred embodiment of the present invention, a positioning unit mountable on a moving object. The unit includes at least one light source measuring unit and a processor. Each light source measuring unit captures relative angular information of the moving object with respect to a plurality of simultaneously active stationary light sources located at multiple locations and includes an optical arrangement producing multiple, overlapped versions of a scene, and an imaging sensor to receive light from the stationary light sources through the optical arrangement. The processor determines positioning information of the moving object at least by disambiguating the overlapped versions of the scene.

Moreover, in accordance with a preferred embodiment of the present invention, the optical arrangement is a matrix of apertures.

Further, in accordance with a preferred embodiment of the present invention, the compressing unit is sensitive to small motions of each measuring unit.

Moreover, in accordance with a preferred embodiment of the present invention, the imaging sensor is configured to generate a sparse array of active pixels at a time.

There is also provided, in accordance with a preferred embodiment of the present invention, a method for determining the position of a moving object. The method includes at least one light source measuring unit on the moving object capturing relative angular information of the moving object with respect to a plurality of simultaneously active stationary light sources in a space located at multiple locations. Each measuring unit has high directional sensitivity along a first axis and low directional sensitivity along a second axis orthogonal to the first axis. The method also includes linearly aligning an imaging sensor of the measuring unit along the first axis to receive light from the stationary light sources through an optical arrangement and determining positioning information of the moving object at least from the output of the at least one light source measuring unit.

Moreover, in accordance with a preferred embodiment of the present invention, the determining includes tracking bright spots on the imaging sensor related to the stationary light sources.

Additionally, in accordance with a preferred embodiment of the present invention, the determining includes tracking peaks in output of the imaging sensor related to vertical features in the space.

Further, in accordance with a preferred embodiment of the present invention, the capturing includes optically compressing the second axis.

Still further, in accordance with a preferred embodiment of the present invention, the imaging sensor is a two-dimensional image sensor having rows and columns of image cells and the determining includes summing columns of the image sensor to generate a representation of the scene.

Moreover, in accordance with a preferred embodiment of the present invention, the moving object is a human head and the positioning information is provided to a virtual reality system.

Further, in accordance with a preferred embodiment of the present invention, the determining includes determining that at least two spatially separated pixels on the sensor are receiving light from at least two bright light sources, and disambiguating the at least two pixels in at least one sensor direction. The disambiguating includes determining correlations among the light receiving pixels of the sensors and using the correlations to determine which pixels are receiving light from the same bright light source.

Finally, in accordance with a preferred embodiment of the present invention, the processor includes a determiner to determine that at least two spatially separated pixels on the sensor are receiving light from at least two bright light sources and a disambiguator to disambiguate the at least two pixels in at least one sensor direction. The disambiguator includes a correlator to determine correlations among the light receiving pixels of the sensors and a selector to use the correlations to determine which pixels are receiving light from the same bright light source.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7 shows two locations labeled (a) and (b);

Figure 1:
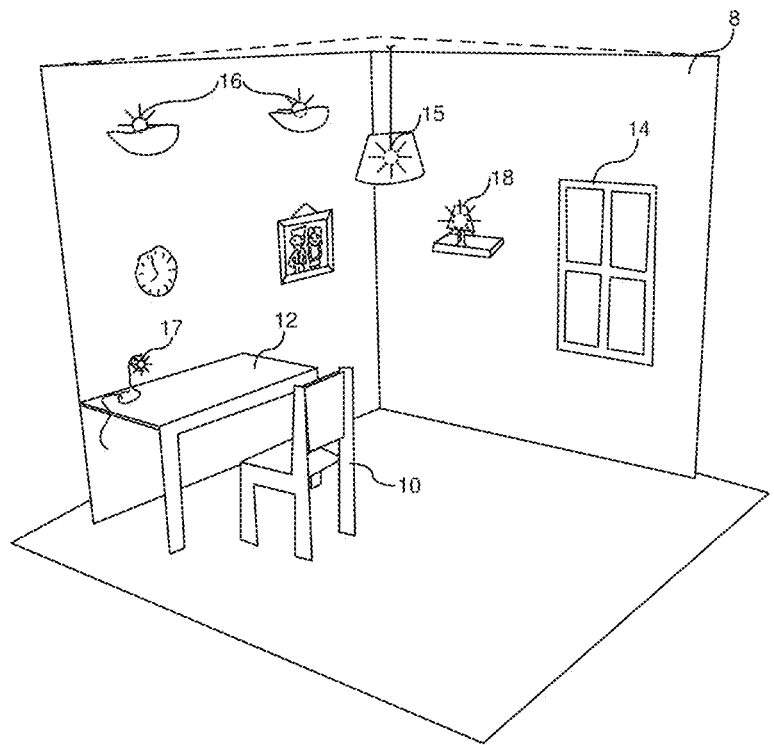
FIG. 1 is a schematic illustration of a typical room having furniture and multiple, stationary light sources, useful in understanding the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Indoor positioning systems of various kinds are commonly used for virtual reality systems. The current most common types are typically indirectly mounted on a user's head and both determine the position of the user's head to allow a virtual reality (VR) system to display the view appropriate to that position. However, existing virtual reality systems make people nauseous, largely because of delays in reaction time of the equipment, between accurately determining the position of the head, calculating the image to display and sending it to the display.

Applicant has realized that this can be solved by using room lighting (like wall lights, ceiling lights, etc.), which are stationary light sources rather than adding special beacons for the virtual reality system or for any indoor positioning system.

Applicant has realized that the stationary light sources in a room are typically several orders of magnitude brighter than typical room features (table corners, picture frames, etc.). Thus, the room light sources can be captured in an image even using shutter speeds of the order of $\frac{1}{1000}$ of a second without the need for bulky large-aperture optics or esoteric high-sensitivity sensors. This enables high-speed image capture with a compact, low-cost device.

Furthermore, applicant has realized that, at such fast shutter speeds, the two-dimensional room image is effectively a sparse matrix, enabling the use of two one-dimensional representations of relative light intensities to contain almost as much information as a two-dimensional representation of the relative light intensities.

Applicant has also realized that a measuring unit which generates a one-dimensional representation may be formed to have high directional sensitivity along a first axis and low directional sensitivity along a second axis. This sensitivity may be generated optically or electronically.

Figure 2:
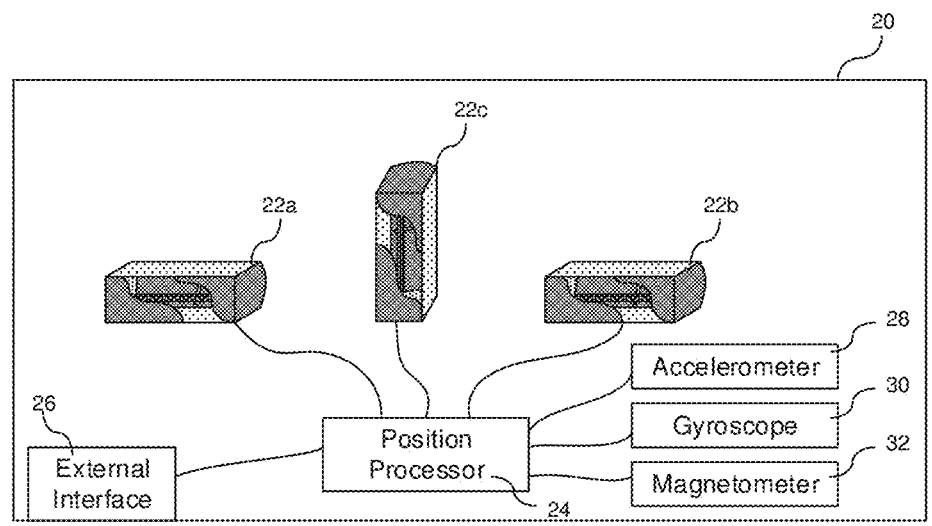
FIG. 2 is a schematic illustration of an indoor positioning system for use with the stationary light sources of FIG. 1, constructed and operative in accordance with a preferred embodiment of the present invention.

Reference is now made to FIG. 1, which illustrates a typical room 8 having furniture (chair 10 and table 12) and multiple, stationary light sources (window 14, ceiling light 15, wall lights 16, desk light 17 and shelf lamp 18). Reference is also made to FIG. 2, which illustrates an indoor positioning system 20 for use with stationary light sources such as those of room 8.

Indoor positioning system 20 may be mounted on a moving object, such as the head of a human for VR applications, or other objects, as described in more detail hereinbelow. Indoor positioning system 20 comprises at least one linear image sensor-based measuring unit 22, a position processor 24 and an external interface 26. Also coupled to location processor 24 may be an accelerometer 28, a gyroscope 30, a magnetometer 32, or any other type or combination of measurement devices. The output of position processor 24 may be provided externally, such as to a virtual reality system, via external interface 26, which may be any suitable communication interface.

Indoor positioning system 20 may comprise one, two, three or more measuring units 22, such as measuring units 22a, 22b and 22c. As described in more detail hereinbelow, each measuring unit 22 may measure angles of incidence of light from one or more light bulbs or other stationary light sources. Typically, the multiple measuring units 22 are provided at separate, often orthogonal directions. Position processor 24 may perform triangulation of the data from at least three measuring units 22 to give the distance and elevation of the light source from the measuring units 22, typically in polar co-ordinates, and, with enough measurements, may provide the six degrees of freedom of placement of indoor positioning system 20 relative to the stationary light sources.

It will be appreciated that the location of stationary light sources (such as light bulb 16) in a room does not change much over time. They may be considered as 'beacons', constantly broadcasting their location to any indoor positioning systems that wish to measure the angles of light rays arriving from those light sources. With calibration, such as in an initial setup or a learning process, it is possible for indoor positioning system 20 to extrapolate from its position relative to the multiple light sources in a room to a position relative to any other frame-of-reference of room position, such as an (X, Y, Z) location within a room where one corner of the room is designated (0, 0, 0).

Position processor 24 may determine the position of system 20 using measurements from linear image sensor-based units 22. Processor 24 may integrate readings from the additional sensors, such as accelerometer 28, electronic gyroscope 30, magnetometer 32. This may also provide a robust absolute indication of the down direction at times when indoor positioning system 20 is not moving. Alternatively, measuring units 22a, 22b, 22c may be used to compensate for accrued errors of accelerometer 28, electronic gyroscope 30, magnetometer 32. Alternatively, in general, accelerometer 28, electronic gyroscope 30, magnetometer 32 may be used to provide 'ball-park' estimates of position to reduce the range of possibilities to be calculated from the information provided by measuring units 22a, 22b, 22c and to compensate for any effective blind spots caused by occlusion. Similarly, measuring units 22a, 22b, 22c may be used to provide high-accuracy positioning information at higher speeds (thus lower latencies) than may be possible to achieve directly using accelerometer 28, electronic gyroscope 30, magnetometer 32.

An additional number of measuring units 22 may be added to indoor positioning system 20 at somewhat offset locations; alternately, multiple instances of indoor positioning system 20 may be coupled together (such as in a master-slave mode). The use of a greater number of measuring units at offset locations may provide for greater operating angle, greater robustness, greater immunity to occlusion, improved positional tracking, greater reliability, improved accuracy, and may provide for a combination of these and other capabilities.

It will be appreciated that indoor positioning system 20 may avoid analyzing all the elements in a scene, and instead, may work with objects of which only a few may appear in an image—namely, lit light bulbs, such as bulbs 16 or other stationary light sources (such as window 14 or shelf lamp 18). The sensor sensitivity may be set low so that the only visible features are the lit light bulbs. Given that only a low overall sensor sensitivity is required, techniques such as pinhole 'lenses' may be applied to provide a more cost-effective or more lightweight image capture system. Clearly, performing image recognition where the only elements to be matched are the stationary light sources, seen from different room positions, is a far less-involved problem than attempting to analyze more complex room objects.

Moreover, since the objects being captured (i.e. the lit light sources) are not only the brightest objects viewed, but may also be several orders of magnitude brighter than the surrounding objects, the amount of image sensor data to be captured and processed may be significantly reduced, as will be described hereinbelow.

It will be appreciated that an indoor positioning system such as indoor positioning system 20 may also determine its position relative to additional light-emitting objects, and thus, may also determine the position of those light-emitting objects relative both to the sensing element in indoor positioning system 20 and relative to the light bulbs. This capability could allow, for example, the position of a hand-held controller that was arranged to emit light (whether of visible or non-human-visible wavelengths) to be determined in real time; multiple light-emitting elements (such as multiple elements on multiple such controllers) could be identified in a similar manner; similarly, the system could be applied to body-worn controllers.

It should also be clear that indoor positioning system 20 may be utilized in the field of "simultaneous localization and mapping (SLAM)" which has application for robotics (such as household robots, commercial robots, and other robots that function in the human environment) as well as for virtual reality, mixed reality and augmented reality. The output of position processor 24 may be used as inputs to a SLAM unit, which may be implemented externally or as part of position processor 24. The SLAM unit may benefit from the limited number of objects identified by the sensing elements of system 20 and by the lack of movement blur by virtue of their fast shutter speeds.

Figure 3A:
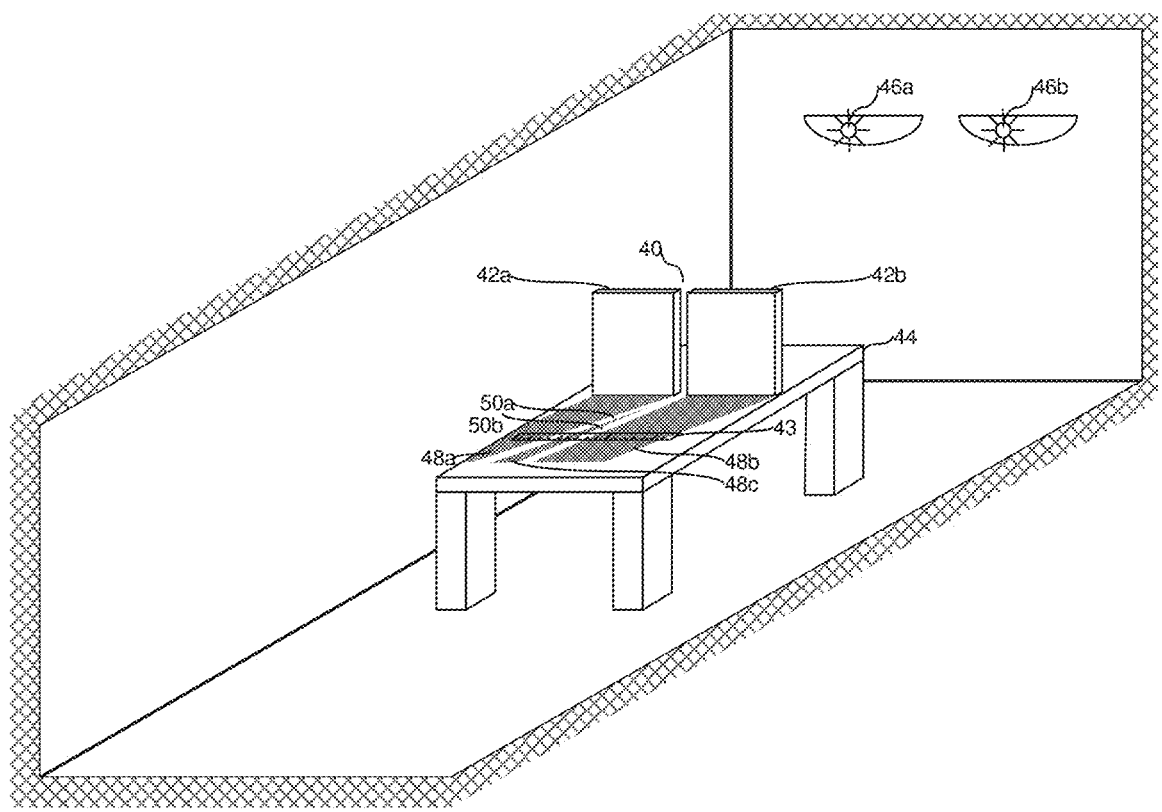
FIG. 3A is a schematic illustration of light impinging on barriers, useful in understanding the operation of a measuring unit forming part of the system of FIG. 2.
Figure 3B:
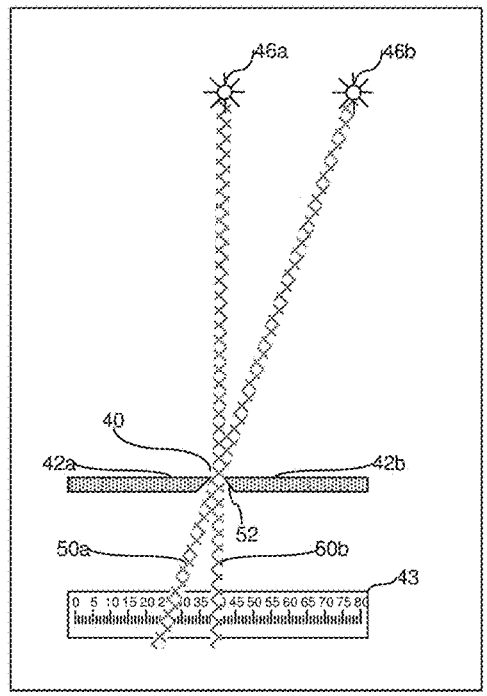
FIG. 3B is a schematic illustration of light beams moving between the barriers of FIG. 3A.
Figure 3C:
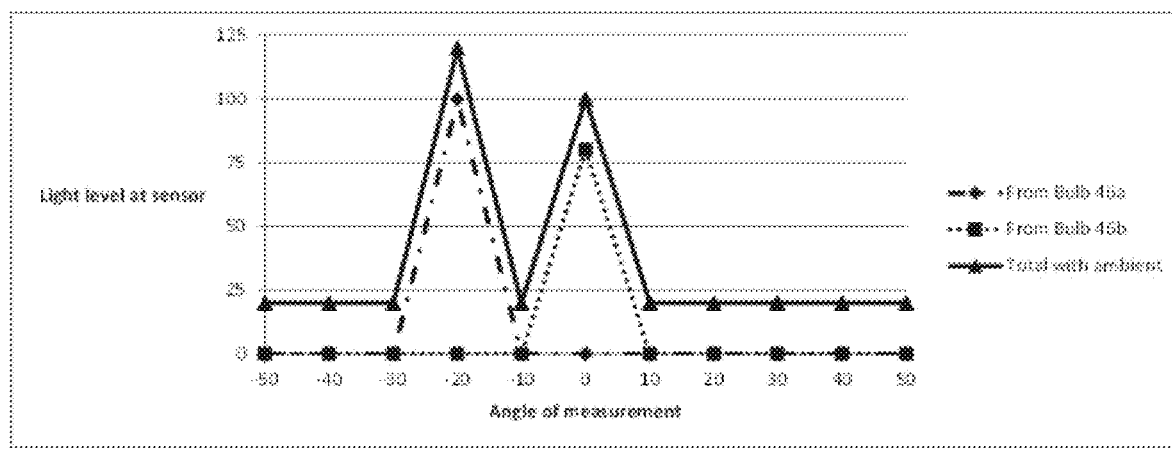
FIG. 3C is a graphical illustration of the measurement to be taken in the situation of FIG. 3A.

Reference is now made to FIGS. 3A, 3B and 3C, which illustrate the principles of operation of measuring units 22. Each measuring unit 22 may comprise a slit 40, formed between two barriers 42a and 42b, and an imaging linear sensor 43. Imaging linear sensor 43 may be any suitable high speed, linear sensor, such as the ELIS-1024 commercially available from Dynamax Imaging of Canandaigua, N.Y.

In FIG. 3A, the two barriers 42 have been mounted on a table 44, placed some distance away from two light sources 46a and 46b. Light sources 46 may be any incandescent, fluorescent, LED, or other such light bulb, or light from the sun, provided through a window of some kind.

Barriers 42a and 42b may cast a left shadow 48a (caused by barrier 42a blocking light from both light bulbs 46), a right shadow 48b (caused by barrier 42b blocking light from both light bulbs 46) and a center shadow 48c (caused by bather 42a blocking light from light bulb 46a and barrier 42b blocking light from light bulb 46b), leaving two strips of light 50a and 50b. Strip 50a may be between left shadow 48a and center shadow 48c while strip 50b may be between center shadow 48c and right shadow 48b.

FIG. 3B schematically illustrates the room setup of FIG. 3A. Two strips of light 50a and 50b are cast by the action of barriers 42a and 42b on light arriving from light sources 46a and 46b. In FIG. 3B, barriers 42a and 42b are shown having an angular wedge 52 at the point at which light rays are allowed to pass through; this angular wedge 52 may provide a more clearly defined slot.

As can be seen in FIG. 3B, light strips 50a and 50b clearly impinge on separate locations on imaging sensor 43 and each lit area of imaging sensor 43 may be mapped back to the angle at which the light was received from the associated light source, as described in more detail hereinbelow. FIG. 3C represents the output of imaging sensor 43 for the configuration of FIG. 3B, where the light strikes slot 40 and continues towards imaging sensor 43 at angles of 0 degrees and −20 degrees relative to the perpendicular. Readings may be made at every 10 degrees of angle from −50 to +50 degrees. In this example, there may be a peak intensity at −20 degrees corresponding to the light from light bulb 46b and there may be a peak intensity at 0 degrees, corresponding to the light from light bulb 46a. There may also be 'ambient' light illuminating all points on linear sensor 43.

Position processor 24 may be able to differentiate the light from light source 46a and 46b by having a 'threshold' level to identify the increase in light at angles −20 and 0 degrees that each correspond to the presence of light from one of the light sources 46a or 46b.

It will be appreciated that, due to the angular nature of light, increasing or decreasing the angle between measuring unit 22 (i.e. linear sensor 43 together with slot 40) and a light source 46 will change the location at which the light from the light source will impinge on linear sensor 43. However, moving towards or away from a light source 46 while maintaining the angle of impingement will not change the location at which the light from the light source will impinge on linear sensor 43.

Figure 4:
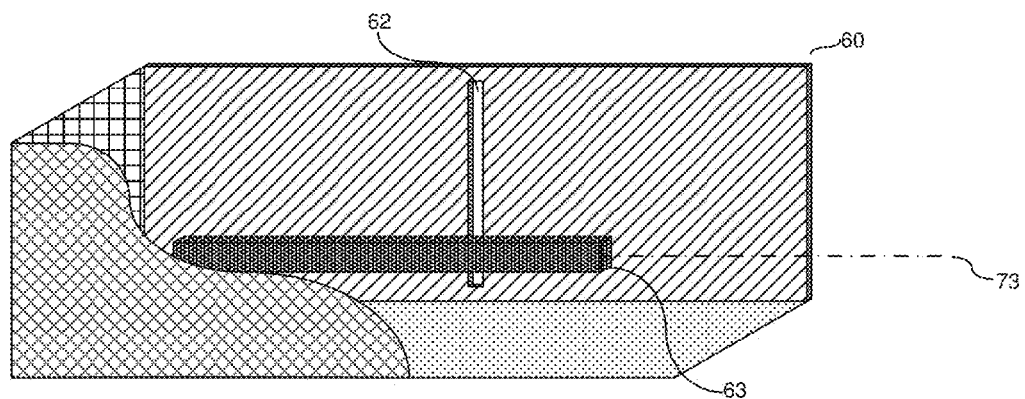
FIG. 4 is a schematic illustration of an exemplary measurement unit having a slit, forming part of the system of FIG. 2.

Reference is now made to FIG. 4, which shows an exemplary embodiment of measuring unit 22, whereby measuring unit 22 comprises an enclosure 60 having a slot or slit 62 and linear image sensor 63. Slot 62 may cast a beam of light from any light source arriving from certain directions (i.e. in view) onto linear image sensor 63. Slit 62 may be formed by a gap in the wall of enclosure 60, the gap being introduced during manufacture, such as by a machining process, a molding process, or some other process. Slit 62 may be covered with an optically transparent material being inserted into the wall of enclosure 60, such as to permit light to enter but to block the ingress of dirt and liquids. Other methods of forming slit 62 are possible, for example by forming the entirety of enclosure 60 from an optically-transparent material, followed by deposition of a layer of optically opaque material (such as a thin metallic layer) over the inside walls of enclosure 60 with the area of slit 62 excepted (for example by a temporary mask over the intended slit area). The key feature of slit 62 is to permit the ingress of light (whether of visible wavelengths or non-visible wavelengths) whilst other paths of light ingress are blocked by enclosure 60.

Enclosure 60 may also block unwanted light from entering from sides other than the side with slit 62 and may also provide a precise mounting arrangement for sensor 43. It may also allow light rays from below the horizontal level of sensor 63 to be captured.

Linear sensor 63 may measure the light levels at a series of points perpendicular to and offset from slit 62 and may provide a repeating analog electrical signal whose voltage at any particular time represents the amount of light that has been received along a certain small part of the length of linear image sensor 63 during a certain small period of time, with the whole or selected parts along the length being cycled through rapidly. Although linear image sensor 63 is described and depicted as "linear", it should be apparent that in the apparatus described, the term "linear" may also be considered to describe the attribute of the series of measurements of light levels that they represent the levels of light measured along an axis 73 passing along the length of linear image sensor 63.

Figure 5:
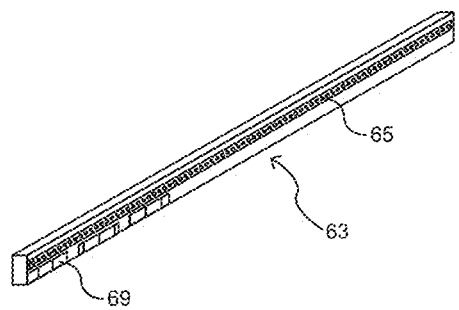
FIG. 5 is a schematic illustration of an exemplary linear sensor, forming part of the measurement unit of FIG. 4.

As shown in FIG. 5 to which reference is now briefly made, linear image sensor 63 may comprise a series of typically several thousand detector elements 65 in a straight line or other arrangement, such as a saw-tooth. Each of the many detector elements may be sensitive to the reception of light across an identical range of wavelengths (such range may include human visible and non-human visible wavelengths).

Linear image sensor 63 may also comprise control elements that enable external control over power saving mode, capture rate, light integration time (shutter), gain, or other controls, as well as optional signal processing elements 69.

Referring back to FIG. 4, linear image sensor 63 may be mounted in enclosure 60 such that detector elements 65 may point towards slit 62. As discussed hereinabove, measuring unit 60 may also be relatively insensitive to changes in the position of light sources 46 (FIG. 3) in a direction parallel to the length of slit 62 (and thus perpendicular to the length of linear image sensor 63 and at a fixed distance from it). For example, when slit 62 is vertical, as shown in FIG. 4, then measuring unit 22 may be relatively insensitive to changes in the height of light sources 46.

It will be appreciated that indoor positioning system 20 may provide a very fast indication of an angle of visible light bulbs in relation to sensor 63. Consider, for example, a commercial wheeled robot patrolling at night through a shopping center dispensing an aerosol fragrance at regular intervals. A single device, such as measuring unit 22 or 60, may be mounted on the robot at a known height of, say 50 cm. The light bulb arrangement of the shopping center is unlikely to change on a daily basis (especially in terms of the minimal lighting that will be on at night). It may be sufficient for measuring unit 22 or 60 to capture light from previously known light bulbs (such as light bulbs placed on the sides of a corridor entrance) for the robot to be able to calculate its position precisely, since there may only one position in which the robot can place itself in order to observe the lights at given positions on sensor 63; given that the height of the measuring unit 22 or 60 on the robot is fixed. Such a robot could utilize measuring units 22 to correct for accumulated errors caused by any inertial navigation system on the robot. The robot may also utilize measuring units 22 or 60 to allow it to position itself with far greater accuracy at the specific places at which it is to dispense the fragrance. With sufficient light bulbs spread throughout the shopping center and a sufficient angular range of view (such as may occur with periodic rotations of the robot), such a robot may be able to navigate throughout the shopping center entirely based on the signals received from measuring units 22 or 60.

Measuring units 22 or 60 may be utilized to remove accumulated errors in the tracking system of low-cost virtual reality (VR) systems. Such low-cost VR systems may utilize a mobile device, such as a smartphone, in a headset housing that includes twin optics that allow the smartphone screen to be presented at close range to a wearer's eyes. Such a system may make use of the accelerometers and magnetometers built into the smartphone to update a record of the headset location as the wearer moves their body and their head. Nevertheless, such a system is highly susceptible to accumulation of position errors due to the integration of accelerometer readings. Measuring units 22 or 60 may be incorporated into such a system to give constant indications of the angular relationship between the headset and a proximate light source, which (possibly taken together with magnetometer readings), may be used to identify and correct for accumulated errors in headset position determined by accelerometer alone.

Multiple measuring units 22 or 60 may be placed at offset locations (such as on two edges of a headset, or around the perimeter of a robot) and may be placed at different orientations. As described in more detail hereinbelow, these may allow more advanced positioning calculations to be performed, such as instantaneous distance calculations to a single object and such as identification of headset position and orientation in all six degrees of freedom.

Figure 6:
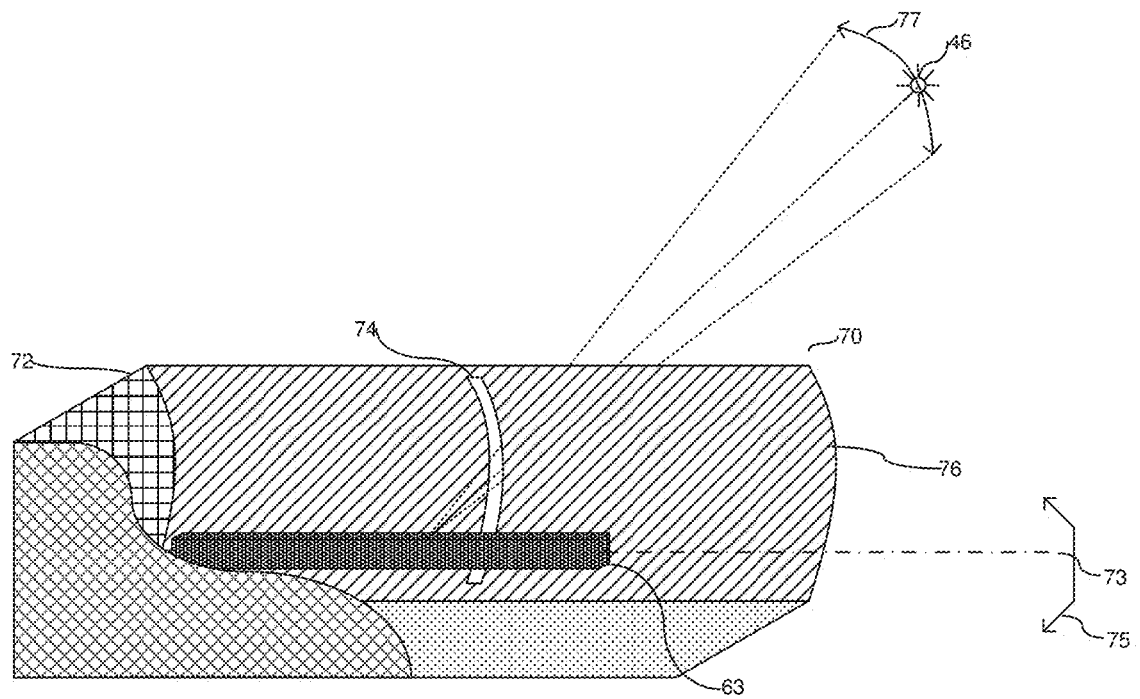
FIG. 6 is a schematic illustration of an alternative measurement unit having a curved slit.

Reference is now made to FIG. 6, which is an alternative embodiment of measuring unit 60, labeled 70, to provide enhanced immunity to changes in the tilt of the measuring unit (i.e. the tilting up or down of axis 73 of measuring unit 60).

In FIG. 6, alternate measuring unit 70 comprises image sensor 63, an enclosure 72 and a curved slit 74 formed in a wall 76 of enclosure 72. To produce curved slit 74, wall 76 may be cylindrical rather than flat, where the center of the curvature may run along the line formed by detector elements 65 of linear image sensor 63. The dotted lines of FIG. 6 illustrate that when measuring unit 70 may rotate or tilt, as indicated by arrow 75, light source 46 may appear to move along a curved path, indicated by arrow 77, a constant distance from linear image sensor 63 perpendicular to the length of linear image sensor 63. In this embodiment, curved slot 74 may mitigate changes in the received image at sensor 63 caused by this tilt of sensor 63. Thus, curved slot 74 may prevent measurement changes caused by such tilting of measuring unit 70 relative to light source 46. Alternate choices of curvature may be chosen to give alternate behavior.

Figure 7:
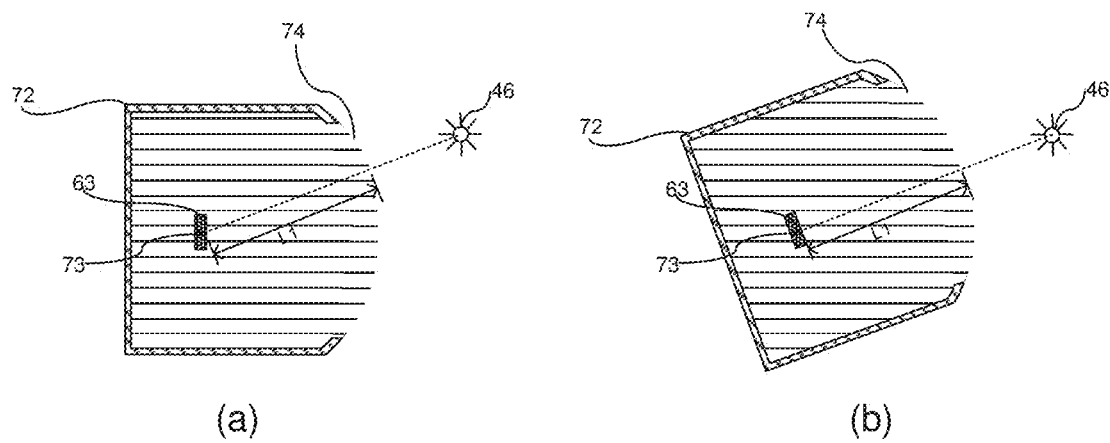
FIG. 7 is a schematic illustration of the measurement unit of FIG. 6, showing its relationship to a stationary light source during rotation of the measurement unit, where

Reference is now made to FIG. 7, which illustrates a vertical cross section of measuring unit 70 through curved slit 74, in relationship to light source 46 during rotation of the measurement unit. FIG. 7 shows two locations in the rotation, labeled (a) and (b). Curved slit 74 is shown as being a radial distance L1 from linear image sensor 63. In (a), measuring unit 70 is facing horizontally and light source 46 is at an angle to sensor 63. In (b), measuring unit 70 has been rotated to face light source 46, and thus, a line between light source 46 and sensor 63 is perpendicular to the length of sensor 63.

It will be apparent from FIG. 7 that, irrespective of the vertical angle of light source 46 to sensor 63, light may travel a fixed the distance L1 from the point at which the light passes through slit 74 and impinges on sensor 63. By trigonometric principles, it will be appreciated that this principle of constant distance for any vertical angle may hold for any choice of horizontal angle of light entering the enclosure (i.e. the distance travelled may be a function of the horizontal angle, but not of the vertical angle).

Moreover, light rays from light source 46 may strike the face of linear image sensor 63 at different angles (for example due to a tilt of measuring unit 70), but the light rays from light source 46 will still strike the same point on sensor 63. Thus, the key distances and angles of the light path from light source 46 to linear image sensor 63 may be unaffected by this rotation.

It will be appreciated that measuring units 60 or 70 may be sufficient to provide an accurate, fast reading of device rotation without accumulated errors and at lower power than regular image processing approaches, such that the addition of measuring units 60 or 70 to a standalone VR headset may provide a significantly improved user experience for very little additional system complexity.

Figure 8:
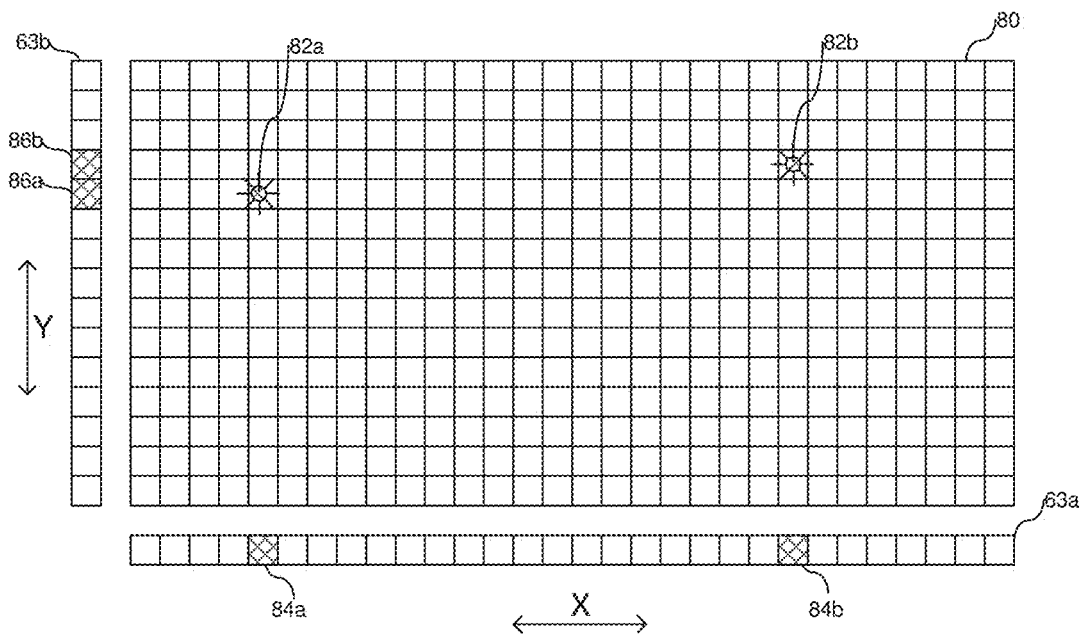
FIG. 8 is a schematic illustration of two orthogonal linear sensors and a two-dimensional scene that they view.
Figure 9:
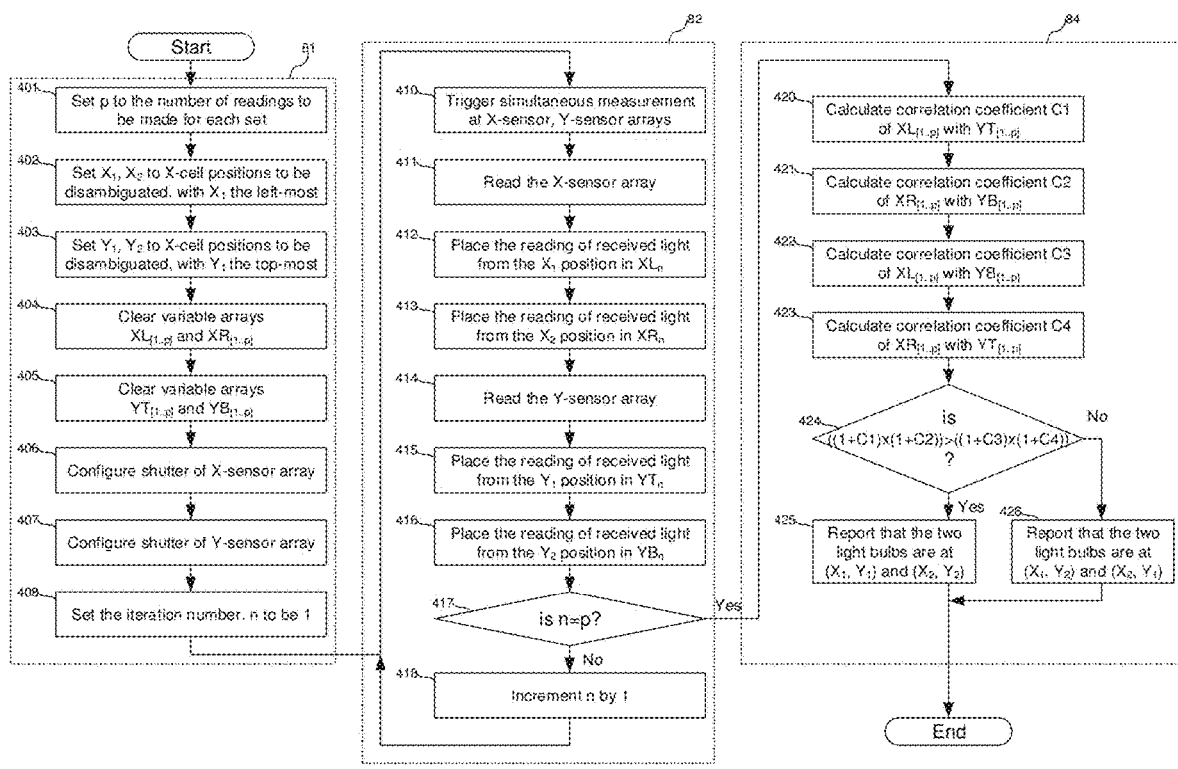
FIG. 9 is a flow chart illustration of an exemplary method of disambiguation of the output of the sensors of FIG. 8.

Reference is now made to FIGS. 8 and 9, which may illustrate one aspect of the operation of position processor 24. FIG. 8 illustrates how image data may be compressed using two orthogonal linear sensors 63, such as in vertical and horizontal directions, such as may form part measuring units 22a and 22c, and FIG. 9 is a flow chart illustration of the calculations performed by position processor 24.

FIG. 8 schematically illustrates two sensors 63a and 63b located, within their measuring units 22, 60 or 70, in the horizontal and vertical directions, respectively. Together, they view a scene, the image of which as it would appear on a 2D image sensor though a conventional lens is illustrated here and labeled 80. Such a scene may have two light sources, the images of which (as they would appear on the 2D sensor) are here labeled 82a and 82b, therein. FIG. 8 shows horizontal sensor 63a having 30 pixels and vertical sensor 63b having 15 pixels such that two-dimensional image 80 is equivalent to a 30×15 grid of 450 pixels.

Horizontal sensor 63a may sense light sources 82a and 82b on two pixels 84a and 84b, respectively, which may be fairly far apart. Each pixel 84 may represent the sum of the image information in the column of image 80 above it. Since light sources 82 are significantly brighter than any other objects near them, pixels 84 may represent the light from light sources 82.

A similar arrangement holds for vertical sensor 63. Vertical sensor 63b may sense light sources 82a and 82b on two pixels 86a and 86b, respectively, which may be neighboring pixels since light sources 82a and 82b may be located at similar heights. Here too, each pixel 86 may represent the sum of the image information, but here, the information is that in the row of image 80 beside it.

Thus, sensors 63a and 63b may provide X and Y summing, respectively, to reduce the image sensor data relative to 2D image sensor 80. Even with low sensor sensitivity, the only objects whose light will register significantly at the sensor are lit light sources, since, as mentioned hereinabove, the intensity of light from lit bulbs may be thousands of times greater than the intensity of light from similar-sized objects that are merely reflecting the ambient light. It is noted that the use of X and Y summing introduces a certain loss of information where multiple light sources are measured, which is discussed in more detail hereinbelow.

It will be visually clear from FIG. 8 that, taken together, the readings of horizontal, or X, sensor 63a and vertical, or Y, sensor 63b allow a determination—with some limitations—of the position of two light bulbs in terms of their X, Y co-ordinates from an analysis of a total of only forty-five measurement readings (thirty of X sensor 63a and fifteen of Y sensor 63b). This is as opposed to the 450 measurement readings that would be needed to read two-dimensional space 80. It will be appreciated that the X-summing and Y-summing described herein is performed by optical means (i.e. by allowing light to reach linear image sensors 63 from a range of directions and compressing it into one axis) and not by electronic means.

However, there remains the problem of disambiguating the position of the two light sources 46. For two light sources, there may exist two X-readings and two Y-readings, yet there is no immediate way to determine which X-reading correlates with which Y-reading, and therefore, there is a set of alternate positions of the light sources (e.g. where the heights of the light sources in the scene are exchanged) which could result in identical readings. It will be noted that were the light sources of significantly different brightness, it may be trivial to identify which X-reading correlates with which Y-reading, solving the problem; generally, though, the solution is not so straight-forward.

Position processor 24 may perform disambiguation (a process of correlating X-readings with Y-readings) using any of a range of techniques, such as additional sensors, arranged at an offset that may only see one of the light sources, learning from previously captured readings from a different angle, and so forth.

Alternatively, position processor 24 may utilize the inherent flicker of many types of light sources. For example, incandescent light sources may exhibit a modulation of light output (i.e. flicker) in sync with the AC line frequency (for example flickering at 120 Hz when used with a 60 Hz AC supply), with the depth of modulation (for example, expressed as a difference between peak and minimal light output over half a 60 Hz cycle as a percentage of peak light output) that may be a function of the thermal mass of the filament. For LED light sources, the depth of modulation may be a function of the both the design and the actual component values of the AC line converter circuit in the LED bulb with each bulb's modulation independent of other bulbs.

It will be noted that if the sensors 63 are capable of capturing light readings at an extremely high rate (for example, at more than twice the frequency at which the fastest LED power supply switching circuit might operate), it may be possible to take readings sufficiently fast enough to determine the frequency of the LED power supply for each of the readings of X sensor 63a and Y sensor 63b. For this embodiment; disambiguation may take place on the basis of matching the determined frequency of each X-reading with the nearest determined frequency of a Y-reading.

It is appreciated that many different techniques may be applied to achieve disambiguation, particularly where movement of the sensing system over time causes individual light sources to enter and exit the field of view of one or more of the sensors at separate times.

FIG. 9 illustrates an exemplary method of disambiguation that may make use of the inherent flicker of light sources. The input may be X-array and Y-array readings (such as provided by X sensor 63a and Y sensor 63b) and the output may be what (X, Y) positions would have received light on an X,Y grid (such as that represented by 2D image sensor 80) for the case of two light sources.

Position processor 24 may perform the method of FIG. 9, which may have three stages, an initialization stage 81, a data capture stage 82 and a data analysis stage 84. Initialization stage 81 may prepare the processor 24 to capture readings of received light appropriately (steps 402-403), may prepare a data structure to store the captured readings (steps 404-405), may configure sensors appropriately (steps 406-407) and may set up a mechanism for counting the number of readings captured (steps 401 and 408).

In step 401, processor 24 may initialize a variable p to the number of readings to be made for each set. For example, if the variable p is set to 5, then the light arriving at the X-sensor array and Y-sensor array will be measured and recorded five separate times (in rapid succession). With a suitable number of samples of received light levels, it should be possible to determine, based on the flicker which causes variations of intensity over time, the Y and the X pixels which are receiving light from the same source.

In steps 402 and 403, processor 24 may assign values to variables to represent positions of interest on the X-sensor array and Y-sensor array. Such positions may correspond to the positions for which light was received in a previous reading and that requires disambiguation. For example, with reference to the cell locations shown in FIG. 8, the variables X1 and X2 may correspondingly be set to the positions of pixels 84a and 84b, with the pixel number of pixel 84a being placed in X1 and the pixel number of pixel 84b being placed in X2 (if the very left-most cell of the X-sensor array is cell 0, then X1 will be 4 and X2 will be 22). Similarly, Y1 and Y2 may be set to the positions of pixels 86b and 86a, respectively.

In steps 404 and 405, processor 24 may clear four variable arrays, XL, XR, YT, and YB, corresponding to Left-X, Right-X, Top-Y and Bottom-Y respectively, with each of these variable arrays able to hold a number of readings corresponding to the number p of readings to be made. Processor 24 may, in steps 406 and 407, configure the shutter parameters of sensors 63, typically to identical settings. For example, the parameters might be to record the received light for their sensor cells during a period of $1/1000$ second, starting from an initiation pulse trigger. Additional parameters of the sensor array (for example, gain, black level) may also be set during these stages, if desired. Finally, in step 408, processor 24 may set an iteration counter variable n to an initial value of 1.

Processor 24 may begin data capture procedure 82 by generally simultaneously sending (step 410) a trigger indication to the two sensors 63, causing them to measure the received light over the configured period (of course, other approaches may be possible, such as sending a simultaneous start request followed by, sometime later, a simultaneous stop request, thus avoiding the need to configure the period during steps 406 and 407).

Processor 24 may then read out (step 411) the data from X-sensor 63a and may place (steps 412 and 413), the values corresponding to the light intensity received at chosen cell X1 in the XL array entry corresponding to iteration number n and the value corresponding to the light intensity received at chosen cell X2 in the XR array entry corresponding to iteration number n.

Processor 24 may then repeat the process for data from Y-sensor 63b in steps 414, 415 and 416.

Processor 24 may continue to decision step 417, where the number of data captures taken so far, n, is compared with the number p of data captures to be taken to determine whether to increment n by 1 and continue with data capture stage 82 or to continue to data analysis stage 84 (once p data captures have happened).

Processor 24 may first perform, at steps 420, 421, 422, and 423, four correlation calculations, each, for example by application of the standard statistical method of "Pearson product-moment correlation coefficient" (https://en.wikipedia.org/wiki/Pearson_correlation_coefficient) at step 420, the correlation of the series of p readings of XL with the p readings of YT is calculated; at step 421, the correlation of the series of p readings of XR with the p readings of YB is calculated; at step 422, the correlation of the series of p readings of XL with the p readings of YB is calculated; and at step 423, the correlation of the series of p readings of XR with the p readings of YT is calculated; the results of these four steps being placed, respectively, into variables C1, C2, C3, and C4.

At decision step 424, processor 24 may compare the correlation values, to see whether the pair of correlations C1 and C2 appear strong or whether the pair of correlations C3 and C4 appear strong. Clearly in a two-light source arrangement, there may be permutations that would not make sense (such as an indication that one bulb is responsible for light measured for the left-most, right-most, and top-most readings, with the other bulb responsible for light measured only for the bottom-most reading), and therefore step 424 may be restricted to a simple yes/no determination that measures whether the correlation indications of steps 420 and 421 (C1 and C2) are stronger than the correlation indications of steps 422 and 423 (C3 and C4).

Specifically, step 424 may ask the question:

a. $Is(1+C1)(1+C2)>(1+C3)(1+C4)$?

If, at decision step 424, the comparison of the correlation values indicates that the correlation indications of C1 and C2 are better (i.e. a higher calculated number) than the correlation indications of C3 and C4, then processor 24 may continue to step 425 where processor 24 may report that the positions of the two light sources are such that one light source is delivering the light to array elements X1 and Y1 and the other is delivering light to array elements X2 and Y2. Typically, such a report may list the two co-ordinate pairs (X1, Y1) and (X2, Y2) as two two-dimensional variables.

Otherwise, processor 24 may report that the positions of the two light sources are such that one light source is delivering the light to array elements X1 and Y2 and the other is delivering light to array elements X2 and Y1. Typically, such a report may list the two co-ordinate pairs (X1, Y2) and (X2, Y1).

Processor 24 may then end data analysis stage 84. The generated report may provide the disambiguation necessary, giving co-ordinates in an X-Y sensor frame of reference for each of the two light sources.

It will be appreciated that the approach of FIG. 9 may also be applied to cases of a greater number of multiple light sources. For example, if the positions of three light sources are to be identified, three sets of X-readings may be correlated against three sets of Y-readings, and the overall accuracy of correlation for each of the six permutations of X-readings against Y-readings may be calculated, with the permutation having the highest overall accuracy declared as the most likely arrangement of X-readings with Y-readings.

It will be further appreciated that in a practical system, multiple adjacent positions on the X-sensor array and Y-sensor arrays may receive light from a single light source; this may be addressed by several means; for example, by choosing the light level reading from the most central position of the adjacent positions to represent the measurement. Alternately, from earlier readings of the sensors, processor 24 may have determined a number of adjacent positions to be averaged to give each reading.

It will be appreciated that the term "measurement" may be used interchangeably with the term "reading"; in some cases, the term "measurement" may be considered a processed form of readings, such as may be achieved by averaging several readings over time and such as may be achieved by applying one or more functions to compensate for one or more non-linearities of a practical sensor and an optical arrangement.

Figure 10:
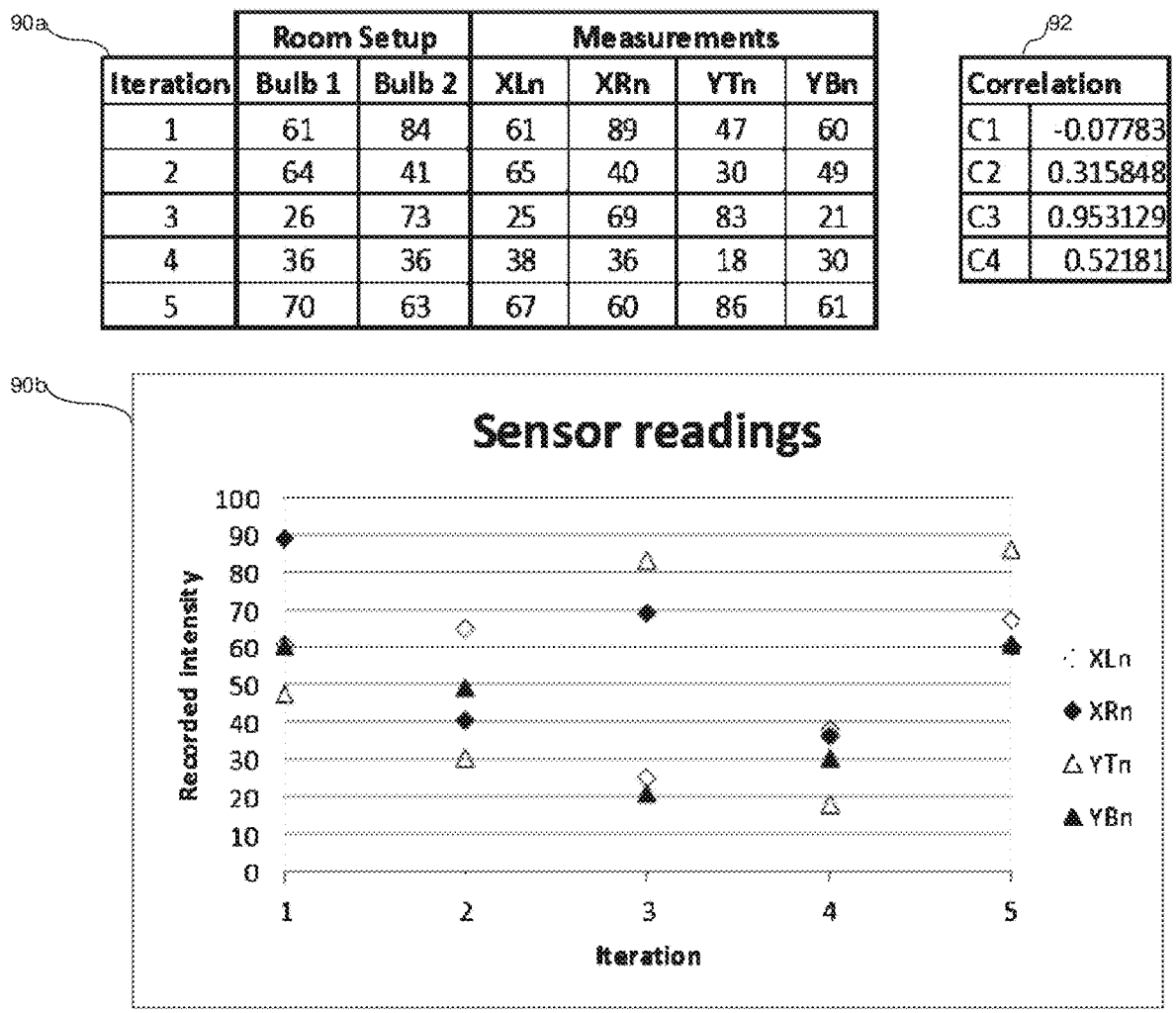
FIG. 10 is a table and graph illustration of intermediate calculations of the method of FIG. 9.

FIG. 10 provides example tables and charts to further illustrate the operation of a disambiguation process described hereinabove for multiple light sources. A sensor reading table 90*a* lists five iterations of measuring incoming light levels during a shutter period, and the resultant values of the variable arrays XL, XR, YT and YB. For clarity, all values and measurements have been normalized to a scale of 0 to 100. For each period, the two bulbs will have had light output levels that were a function of the overall room setup (for example, light source type, instantaneous AC line voltage during shutter period, light source internal circuit state, light source filament thermal mass etc.). These light output levels will have fluctuated from reading to reading due to changes from one iteration period to another, with non-identical fluctuations for the two bulbs.

Chart 90*b* provides the results in chart format, of recorded intensity vs iteration.

Table 92 lists the calculated correlation values from which it can be seen that C3 and C4, with results over 0.5, show high and moderate correlations respectively, whereas C1 and C2, with results under 0.5, show poor correlation.

The XY correlation score calculations for the results in table 92, generated by processor 24 at step 424, may produce the decision that the light sources are at (X1, Y2) and (X2, Y1).

Recall that FIG. 8 depicted an array of 30 cells by 15 cells. In practice, an array suitable for determination, at room scale, the position of a measuring system to within a fraction of a centimeter based on the observed position of light sources would likely be of the order of 4,000 cells by 2,000 cells. It can thus be calculated that a dual linear image sensor approach formed by X and Y sensors of 4,000 and 2,000 pixels, respectively, would involve a total of 6,000 sensors, whereby a sensing grid of 2,000 rows each of 4,000 sensors would involve a total of 8,000,000 sensors. Thus, a dual linear sensor approach (together with horizontal and vertical slits) can achieve similar results using less than 0.1% of the sensors of a sensing grid approach (together with a pinhole).

The dramatic reduction in sensor element count offered by a dual linear approach when compared to a grid approach may allow not only cost benefits and power benefits, but also a dramatic reduction in the amount of data that must be collected from the sensor and analyzed to make a calculation. With less data required per calculation, it may be possible to capture and process data at a higher rate; an 8-million sensor grid sensor system reporting each sensor with 8 bits of light levels resolution (256 light levels) and capturing a set of data at 60 Hz (standard video capture rate) would produce 480 Megabytes per second of capture data, whereas X and Y sensors totaling 6,000 pixels capturing the same 8 bits of light level resolution but at a far higher capture rate of 1000 Hz would produce only 6 Megabytes per second of image data, thus giving over 16× faster capture rate, whilst creating and processing only 1.25% of the amount of capture data.

It will be appreciated that indoor positioning system 20, with any of the embodiments of measuring units 22 described herein, may provide its position, with respect to the stationary light sources in the room, at a fraction of the time, power requirements and computational requirements as for systems which analyze 2D images for objects therein. Thus, system 20 may be useful for virtual reality systems, which currently suffer from overly slow reaction times, one of the causes of sensations of nausea by VR users.

Indoor positioning system 20 may use linear sensors 63 to map the position and orientation of the person or device upon which system 20 is mounted, with respect to the locations of multiple light sources. Importantly, system 20 may operate with standard light fixtures as might typically be found in a room.

It will also be appreciated that the measuring units of the present invention may also receive image data about other objects in the scene which are lit by ambient light. While this data may have much lower intensities, the "vertical" summing optically performed by measuring units 22 may make objects, such as vertical contrast features, which align with the direction of summing, stand out, particularly in areas of the sensor where no bright light sources are visible. Imaging sensor 63 may generate peaks in a positive or negative direction in response to viewing the vertical contrast features. While these peaks may be lower than those for bright light spots, they are still larger than for other objects, due to the vertical summing. Note that the term "vertical" refers to the direction orthogonal to the axis 73 of sensor 63.

This sensitivity to vertical contrast features may help to reduce the nausea sensed by VR users during rotation of a user's head in the yaw direction, because the vertical objects may be tracked. Moreover, this vertical summing may provide high directional sensitivity along sensor axis 73 (which is shown horizontal in FIGS. 4 and 6) but may provide low directional sensitivity along the orthogonal axis, which is shown vertical in FIGS. 4 and 6. Thus, measuring units 22 may be sensitive to the horizontal location of the vertical contrast features but, due to the vertical summing, may not be sensitive to vertical location of the vertical contrast features.

Figure 11A:
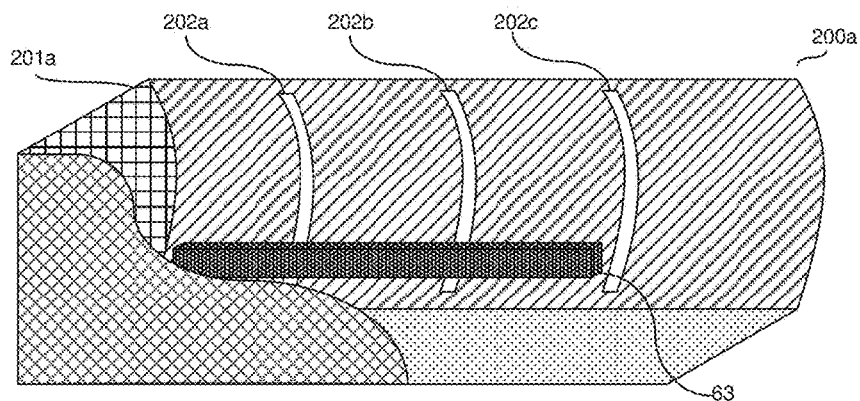
FIGS. 11A, 11B and 11C are alternative embodiments of the measurement unit of FIG. 4 having multiple slits.
Figure 11B:
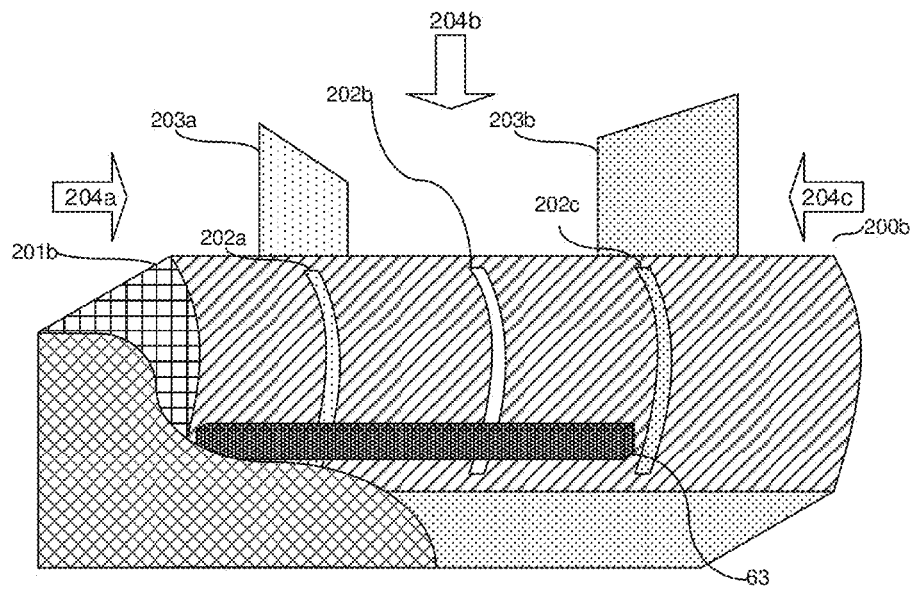
Figure 11C:
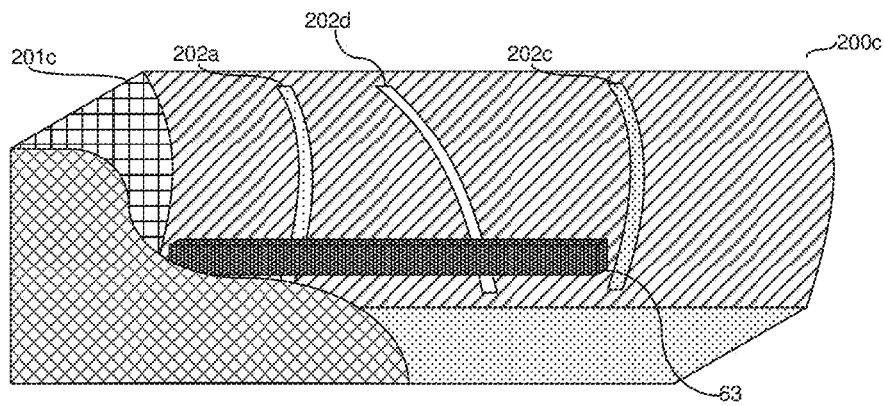

Reference is now made to FIGS. 11A, 11B and 11C, which illustrate alternative measuring units 200a, 200b and 200c. Each unit comprises linear image sensor 63 with alternate enclosures 201a, 201b and 201c, each having more than one slit, here labeled 202. FIGS. 11A and 11B show three parallel slits 202a, 202b and 202c while FIG. 11C shows three slits, one of which 202d, is angled with respect to the other two, 202a and 202c. FIG. 11B additionally includes mirrors 203.

The multiple slit function may enable multiple beams of light from any visible light source to enter each alternate enclosure 201 and to reach its associated linear image sensor 63, effectively giving an output reading of measured light levels at different points along sensor 63 that is equivalent to the sum of multiple separate, co-located measuring devices, each with a slit in a different position. This may be considered analogous to a multiple exposure effect in a film camera (with the multiple exposures taking place simultaneously through multiple apertures rather than at different moments in time).

The addition of additional slits may provide two benefits. The effective sensor length is now increased (for example, slit 202a may have the full length of the sensor extending to its right while slit 202c may have the full length of the sensor extending to its left; taken together this is double the sensor length when compared to the same sensor used with slit 74 (FIG. 6), which may have only half of the sensor length extending on each side), thus allowing a shorter sensor to be used. In addition, the additional slits may give a greater available range (i.e. viewing angle) of measurement, or increasing measurement resolution, or some combination of these.

One approach to differentiating between the superimposed measurements from the multiple slits may be to add different color filters (such as red, green, blue) for each of slits 202a, 202b/d and 202c, and to combine this with an image sensor that contained an array of sensors for each of these three colors. Another approach would be to apply an analytical process. For example, for the enclosure 200a, it could be deemed very unlikely that rays from a single light bulb would enter the enclosure through the two outer slits, but not through the center slit. Therefore, where sensor 63 reported receiving light opposite both outer slits, but not from the inner slit, it could be deduced that the light striking the sensor portion opposite the right slit was actually coming from a light bulb off to the far left of the enclosure (through the left slit), and that the light striking the sensor portion opposite the left slit was actually coming from a second light bulb off to the far right of the enclosure (through the right slit). A further approach, which may be combined with the previous one, would be to consider the pattern of light striking sensor 63 in the time domain. For example, as the measuring units is rotated in a horizontal plane, additional light bulbs may come into view, with light arriving first only through a side slit. These bulbs could be tracked over time as they come into fuller view, arriving through multiple slits, such that measurements of all three exposures of this bulb could be combined to improve the accuracy of the measurement.

A simpler approach to differentiating between the superimposed measurements may be to use differing slit widths for each of slits 202a, 202b, 202c, resulting in a set of three different recorded light intensities at different places (for each light source), the intensity of which being a function of the width of the slit through which the light passed and the position of which being a function (amongst other things) of the position of the slit through which the light passed. Alternatively, varying neutral-color light filters may be applied to the multiple slits to give a similar differentiation of light passing through each but without introducing the second-order effects that may occur with varying width slits. Iterative approaches may be used to extract the positions of individual light bulbs, such as considering the brightest readings first, disregarding 'weaker copies' of these readings that may have reached the sensor through the narrower slits, then returning to consider the remaining brightest readings.

One further benefit of the use of multiple slits is that this may allow triangulation, especially of light sources near to the enclosure. Consider a light source that is many meters away from an enclosure which has a gap of 1 cm between slits. The light arriving from the source will enter all three slits at almost identical angles. However, in the case of a light source that is only 10 cm from the enclosure, the light arriving from this source may enter the three slits at angles such as of −6, 0, and +6 degrees. Thus, the use of multiple slits with a single sensor 63 may form the basis from which distance measurements may be made in addition to angle.

The embodiment of FIG. 11B also comprises two mirror-like elements, such as reflector 203a and reflector 203b, with reflector 203a diverting light 204a arriving from the left towards left slit 202a and reflector 203b diverting light 204c arriving from the right toward right slit 202c. The center slit may receive light 204b arriving generally from straight ahead. Appropriate choices of enclosure, slits, reflector, and sensor may allow light to be collected from a very wide horizontal angle, potentially exceeding 270 degrees. The techniques of FIG. 11B may be combined with the techniques of FIG. 11A, for example using an enclosure having nine slits, with three slits servicing each reflector and a further three slits looking straight ahead with no reflector. Likewise, reflectors may be arranged to look upwards or at different oblique angles.

The embodiment of FIG. 11C, a unit 200c, may be used to derive a vertical as well as a horizontal angle of received light using a single linear image sensor. Unit 200c may be particularly suitable in cases where sensor 63 may be relatively long or where sensor 63 is an R-G-B sensor and color filters are used with each of the slits, although it is also suitable in the absence of these arrangements.

Unit 200c may comprise alternate enclosure 201c in which at least one of the slits 202 may lie at a different angle to another slit. For example, as depicted in FIG. 11C, the two outer slits 202a and 202c may be similarly arranged as in FIG. 11A while the middle slit may be a rotated center slit 202d. The two outer slits 202a and 202c may be used to determine the horizontal angles of incoming light, as described hereinabove, allowing processor 24 to use triangulation to determine the distance between unit 200c and the light source. These calculations are largely impervious to the vertical angle at which the light enters enclosure 201c.

By virtue of its rotation (or some other effect such as staggering), the angle at which light passing through rotated center slit 202d enters enclosure 201c may depend not only on the horizontal angle at which it arrives, but also upon the vertical angle. Thus, the angling of slit 202d may function to convert a vertical angular displacement of the light source into a horizontal displacement of the position at which the light reaches sensor 63. Given that the position of the light source may already have been determined by use of measurements on light arriving through the two outer slits 202a and 202c, it may be possible to use the offset position of light that has reached sensor 63 through rotated center slit 202d to further determine the vertical angle from which this light has arrived. Where this approach is used with a regular sensor that is neither sufficiently long to prevent overlap between the beams of various slits, nor that uses a combination of R-G-B filters and an R-G-B sensor to do the same, various techniques (such as varying slit widths) may be applied to the task of differentiating between the superimposed measurements.

It will be appreciated any of the measuring units 22, 60, 70 and 200 may be used to provide an improved positional reference for systems that make use of measuring devices that suffer from accumulative errors. One example would be to use one of the measuring devices described herein to determine the distance from a wall, provided that this wall contained two light bulbs a known distance apart, and providing such measurements whenever both light bulbs are in view of the device.

Figure 12A:
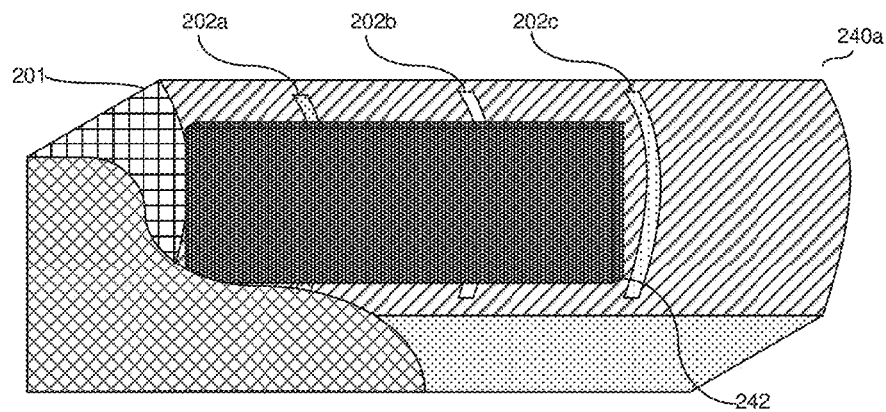
FIGS. 12A and 12B are alternative embodiments of the measurement unit of FIG. 4 having a two-dimensional sensor and multiple slits or a pinhole aperture, respectively.
Figure 12B:
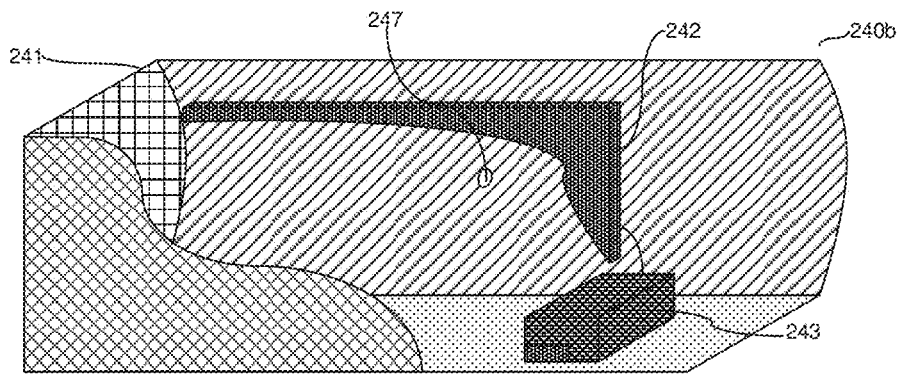

In alternative embodiments, the techniques presented herein may also be implemented in conjunction with more traditional two-dimensional image sensors (X-Y sensor grids). Reference is now made to FIGS. 12A and 12B, both of which show measuring units 240 comprising 2D image sensors 242 receiving light from slits 202.

In FIG. 12A, unit 240a comprises 2D image sensor 242 and an enclosure 201, shown with multiple curved, vertical slit apertures 202a, 202b and 202c, though any of the enclosures described herein are possible. 2D image sensor 242 may be a 4,000 by 2,000 element sensing grid) and may be configured to perform a function similar to a linear sensing array. It should be noted that the arrangement is significantly different from a regular application of a two-dimensional image sensor in that, due to the use of slit apertures, light entering the enclosure from a light bulb is likely to reach sensors in all rows of the image sensor.

Such a system may offer benefits over the regular application of a 2D image sensor. For example, only a small number of the rows of the image sensor may be read, permitting a similar higher capture rate and lower data rate as for a linear sensor. In another approach, a two-dimensional image sensor with a "rolling shutter" (whereby each row of the sensor captures incoming light over a different time period) may be used to achieve a high capture rate (as measured as the time between the capture of each row) similar to that attainable with a linear image sensor.

In FIG. 12B, measuring unit 240b may comprise 2D image sensor 242 (shown cut away) and an enclosure 241 having pinhole aperture 247 together with an integrator circuit 243. The optical arrangement of measuring unit 240b may be similar to that of a pinhole camera; it is the use of integrator circuit 243 that may cause the overall device behavior to be similar to the measuring units described hereinabove. Integrator circuit 243 may be coupled to 2D image sensor 242 and may perform a mathematical integration of the received light values at all Y-positions, for a particular X-position, performing such a function for each of the X-positions as the data is read out of 2D image sensor 242.

Integrator circuit 243 may reduce the large number of readings received from the 2D image sensor 242 to a far smaller number of X-readings that may be substantially similar to the readings that would have been received from linear image sensor 63 used together with a vertical slit, such as slit 74, and these readings may be output as a one-dimensional output vector of readings, similar to that produced by linear sensor 63. It will be noted that an additional integrator circuit (not shown) could perform a similar task to produce a far smaller number of Y-readings.

An advantage of measuring unit 240b when compared to a regular pinhole camera arrangement is that, despite the large data rates flowing from 2D image sensor 242 to integrator circuit 243, the amount of data delivered by unit 240b to processor 24 remains low.

It will be appreciated that measuring unit 240b could also comprise a threshold detector circuit (not shown) which may analyze the light intensity values of each pixel in 2D image sensor 242 as they are read out and may only report those pixels whose intensities are above a certain threshold value. In addition, the threshold detector circuit may report only the position of boundary elements (those that were the first and last elements to detect received light above the threshold in a chosen read-out direction), and these may be delivered using a sparse matrix optimization (for example, in place of outputting values for received light for all elements, only reporting the values of elements having non-zero data values; reporting their X-Y location together with their value).

Figure 13A:
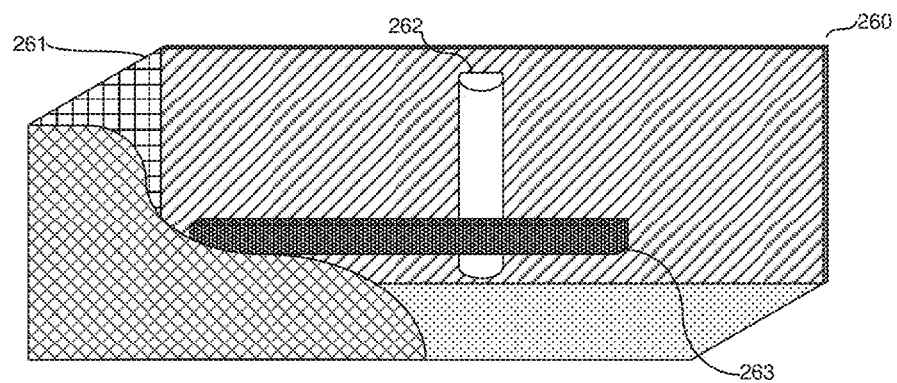
FIGS. 13A and 13B are alternative embodiments of the measurement unit of FIG. 4 having a cylindrical lens with a linear sensor or a standard lens with a two-dimensional sensor, respectively.
Figure 13B:
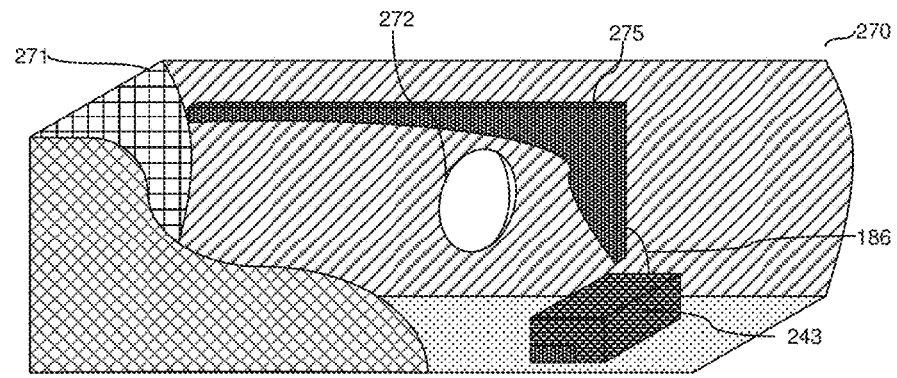

Reference is now briefly made to FIGS. 13A and 13B, illustrating two measuring units; both of which incorporate a lens of some kind. The lenses may allow an increased amount of light into the enclosure while mitigating the de-focusing effect that would occur were the aperture (such as slit, pinhole) to be merely enlarged; it will be appreciated that the use of a lens does not alter the fundamental behavior of the arrangement of the device but may be useful, for example, in cases where the image sensor employed has a low sensitivity to received light.

In FIG. 13A, the lens is a cylindrical lens 262, the slit of enclosure 261 matches the outline of cylindrical lens 262 and the sensor is a linear image sensor 263 which may have low sensitivity. The use of cylindrical lens 262 allows the use of a wider slit such that a greater amount of light is permitted to enter enclosure 261, enabling the use of a low sensitivity sensor.

Cylindrical lens 262 may focus all rays of light passing from a light bulb outside enclosure 261 towards sensor 263 so that they arrive at the same point on the sensor irrespective of the horizontal position at which they entered enclosure 261. The sensor's low sensitivity could be produced by operating the sensor with far shorter shutter periods than would be possible otherwise, thus the use of cylindrical lens 262 may allow very high-speed operation such as tens of thousands of sets of X-readings to be produced per second.

It may be appreciated that multiple apertures may be used, each with a cylindrical lens; likewise, it will be appreciated that the face of the enclosure containing the lens may be curved, with a curved cylindrical lens (may be considered as a section of a bent rod) placed in each of the curved slits of the enclosure.

In FIG. 13B, measuring unit 270 may be similar to measuring unit 240*b*. However, in place of pinhole aperture 247, measuring unit 270 may use a larger hole in its enclosure 271 to accommodate a lens, such as spherical lens 272. The use of a lens may allow a greater amount of light to enter enclosure 271, yet may maintain the focus of the light from an observed bulb onto a small region of the sensor, thereby allowing the use of low sensitivity 2D image sensor 275.

It will also be appreciated that, with multiple, slit apertures, a single light source may be imaged on multiple, spread apart, pixels. This may enable tracking of light sources, which may enable tracking of the motion of the measuring unit.

Moreover, since the elements of the measuring unit are relatively inexpensive, it is also possible to combine capture techniques in a single measuring unit, as shown hereinabove. Thus, a single slit may provide dimension reduction, multiple slits with overlapping fields of view may provide spatial reduction and lenses may provide standard operation but with bright spots only.

Figure 14:
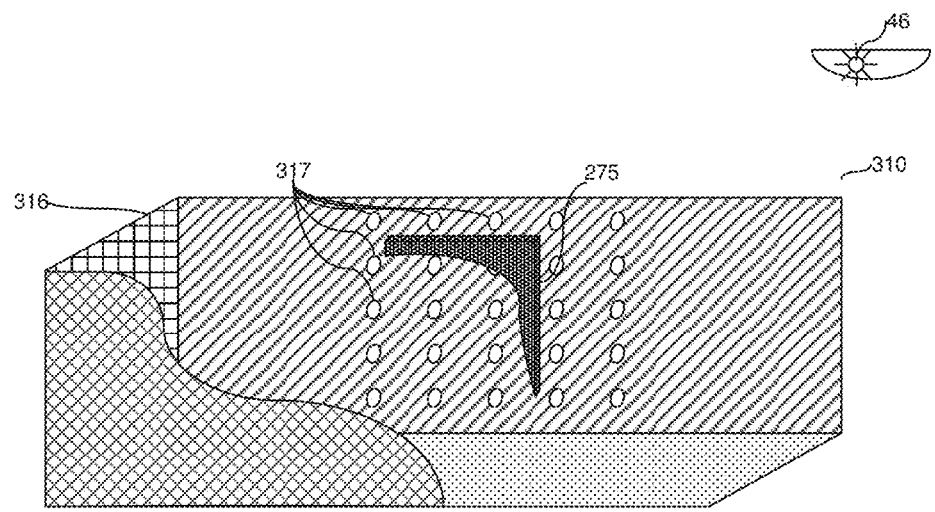
FIGS. 14 and 15 are alternative embodiments of the measurement unit of FIG. 4 having a two-dimensional sensor and an array of pinhole apertures with regular and irregular intervals, respectively.

Reference is now made to FIG. 14, which illustrates a further alternative embodiment in which a modified measuring unit 310 comprises a modified enclosure 316 having an array of pinholes 317 (25 such pinholes are shown in FIG. 14) therein, together with 2D image sensor 275. Enclosure 316 may be created, for example, by one or more of mechanical operations, lithography operations, injection molding operations, 3D printing operations and so forth. The array of pinholes 317 may also be formed in a manner not integral to the enclosure, for example, by use of an external perforated barrier that may be placed adjoining the enclosure.

It will be appreciated that light from light source 46 may, depending on its position, strike 2D image sensor 275 as a result of having passed through at least one of the apertures of the array of pinholes 317. Indeed, it may be noted that, with suitably small distances between adjacent apertures of array of pinholes 317, and for certain positions of light source 46, there will exist multiple locations on 2D image sensor 275 at which the light from light source 46 may strike simultaneously.

Moreover, measuring unit 310 may gather light from a larger field of view than measuring unit 240*b*, since array of pinholes 317 may direct light from a larger space onto sensor 275 than a single pinhole could.

Figure 15:
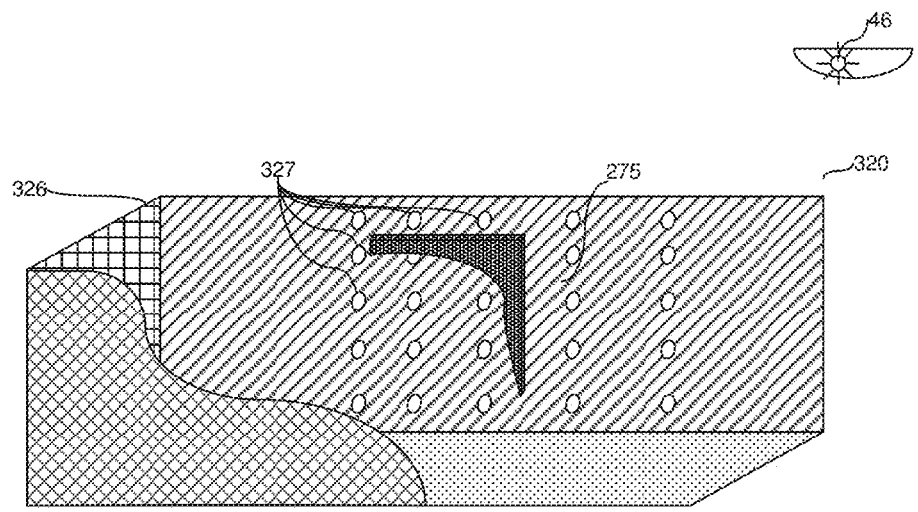

In accordance with an alternative embodiment of the present invention and as shown in FIG. 15, to which reference is now made, the separation between pinhole apertures may be non-uniform, thereby to produce an asymmetrical array of pinholes 327 in an enclosure 326. For example, the spacing between any five apertures in a horizontal direction may be 4, 4.25, 4.5, 4.75 mm respectively. Likewise, the spacing between any five apertures in a vertical direction may be non-uniform. Further possibilities for non-symmetrical arrangements include, but are not limited to, orthogonally-chosen numbers (such that no common multiples are shared, for example 1.1, 1.3, 1.7, 1.9 mm), non-rectangular grid arrangements of apertures (examples of such non-rectangular grids may include hexagonal, tiled, spiral, fractal, and so forth).

The non-uniform spacing between apertures may improve the ability of processor 24 to determine the position of light source 46. For example, when light source 46 is relatively far away from enclosure 326, the activated pixels of 2D image sensor 275 may have uneven spacing. This may make it possible to determine which apertures of array of pinholes 317 the light passed through, and thus to make certain determinations regarding the possible positions of light source 46.

In addition, individual apertures may differ in properties, such as aperture size, color filter and shutter control. In some arrangements, the apertures may be formed by lenses where individual lenses may have different focal lengths. All of these may aid in disambiguating light sources 46.

Figure 16A:
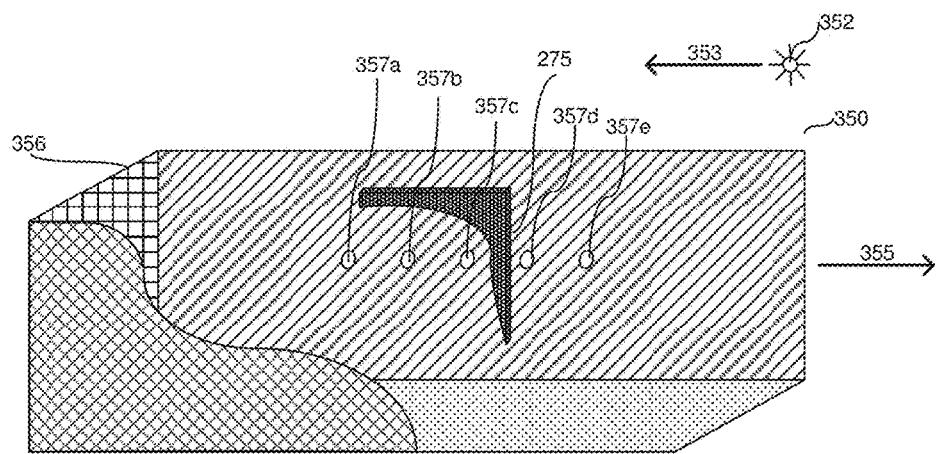
FIG. 16A is an alternative embodiment of the measurement unit of FIG. 14 having a two-dimensional sensor and a single row of pinhole apertures.
Figure 16B:
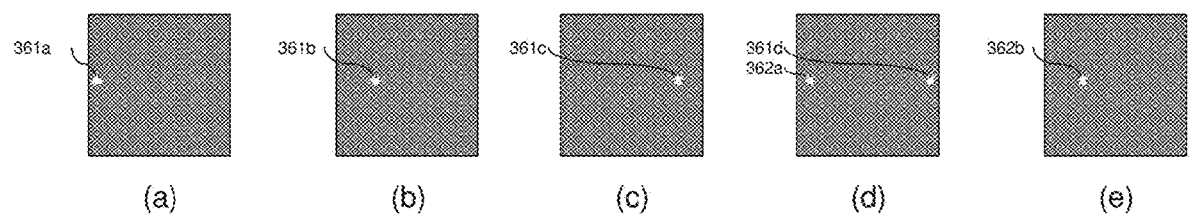
FIG. 16B are illustrations of the image output over time from the measurement unit of FIG. 16A.

Reference is now made to FIGS. 16A and 16B, which illustrates, for clarity, an alternative measuring unit 350 comprising a single row of apertures 357*a*-357*e* in an enclosure 356 and an image sensor such as 2D image sensor 275.

FIG. 16A also shows a light source 352 that may appear to move, for example, in a direction shown by arrow 353, as measuring unit 350 moves as indicated by arrow 355. As measuring unit 350 moves, different apertures 357 may receive light, and may produce different bright spots on image sensor 275, as illustrated in the diagrams (a) through (e) of FIG. 16B.

When light from light source 352 may initially pass through aperture 357*e* (such as may happen once the movement of measuring unit 350 has brought it into view of the arrangement), it may strike 2D image sensor 275 on the left-hand side, as shown in diagram (a) of FIG. 16B, as bright spot position 361*a*. As light source 352 slowly appears to move in a leftwards direction, as indicated by arrow 353, the bright spot on sensor 63 will move to the right, and may appear such as bright spot position 361*b* of diagram (b) and then as bright spot position 361*c* of diagram (c).

However, as measuring unit 350 continues its movement in the direction of arrow 355, light passing through aperture 375*e* may appear as the bright spot at position 361*d* of diagram (d). In addition, light may pass through aperture 357*d* and may strike 2D image sensor 275 at bright spot position 362*a*, as shown in diagram (d). Thus, it can be seen that in measurement unit 350, a light source within the unit's overall field of view may be expected to deliver light to one or more position on the image sensor.

As measuring unit 350 may continue its movement in the direction indicated by arrow 355, the two spots at bright spot positions 361*d* and 362*a* may continue moving to the right, until the spot of bright spot position 361*d* has exceeded the right-hand bound of sensor 63. However, it will be clear that bright spot position 362*a*, having been at the left-hand side of sensor 63 in diagram (d), will remain on sensor 63 (as shown in diagram (e)) even when the spot of bright spot position 361*d* has exceeded this right-hand bound.

It will be appreciated that the true position of the measuring unit may be hard to distinguish without tracking the movement of the spots over time. An exemplary tracking method is described hereinbelow with respect to FIG. 18.

Figure 17:
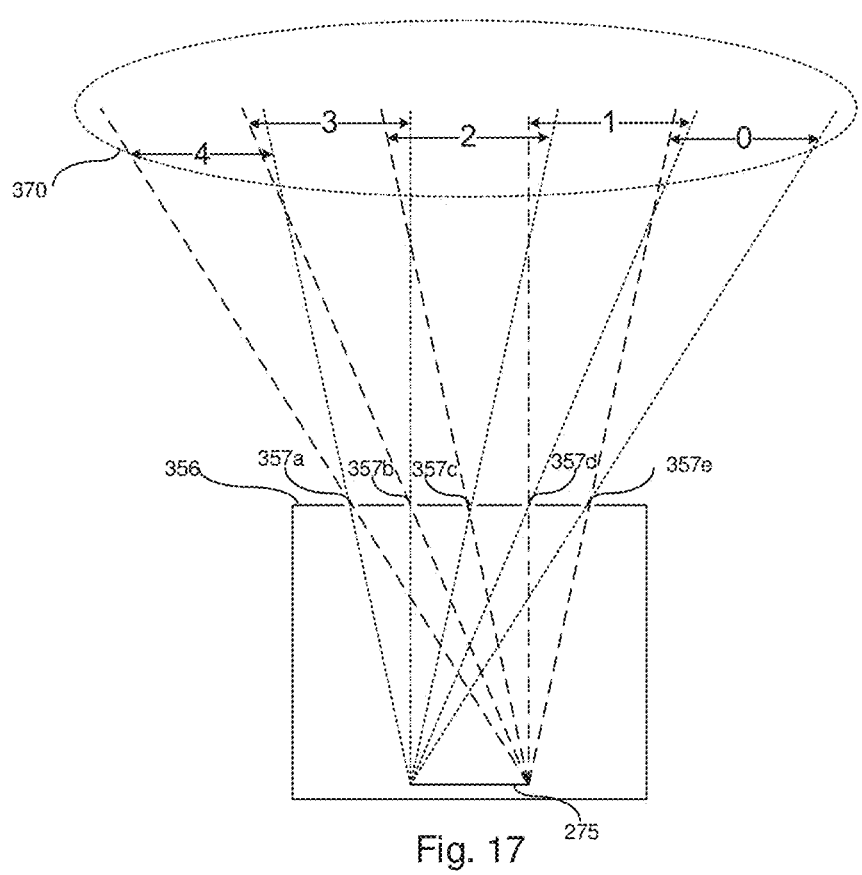
FIG. 17 is a schematic illustration of overlapping regions of view of the multiple apertures of the unit of FIG. 16A.

Reference is now made to FIG. 17, which illustrates the effect of multiple apertures 357a-357e and their effect on a row of sensor 275. The field of view 370 of FIG. 17 may be split into overlapping sensitivity regions, labeled 0 to 4. Regions 0-4 may be individual regions each pertaining to a single aperture (where region 4 corresponds to aperture 357a and region 0 corresponds to aperture 357e). In FIG. 17, the field-of-view of each aperture is delineated by a dashed line corresponding to an optic path (such as in free space) that would reach the extreme right edge of the sensor, and by a dotted line corresponding to an optic path that would reach the extreme left edge of the sensor. It will be appreciated that there exists an overlap between the regions, such that for lights positioned in the overall field-of-view of sensor 275, light from these lights may be expected to reach the sensor through at least one of the apertures. Moreover, when light from a single source may move from one region to its neighboring region, due to the motion of measuring unit 20, there may be a moment when it is viewed both at one edge of sensor 275 in one region and at the other edge of sensor 275 in another neighboring region. This is an indication of a "wrap".

For example, light reaching the sensor through aperture 357e may come from region "0" and may be considered to have wrapped zero times. As the spot moves to increasingly higher region numbers, the wrap value may increase to match the region number.

Figure 18:
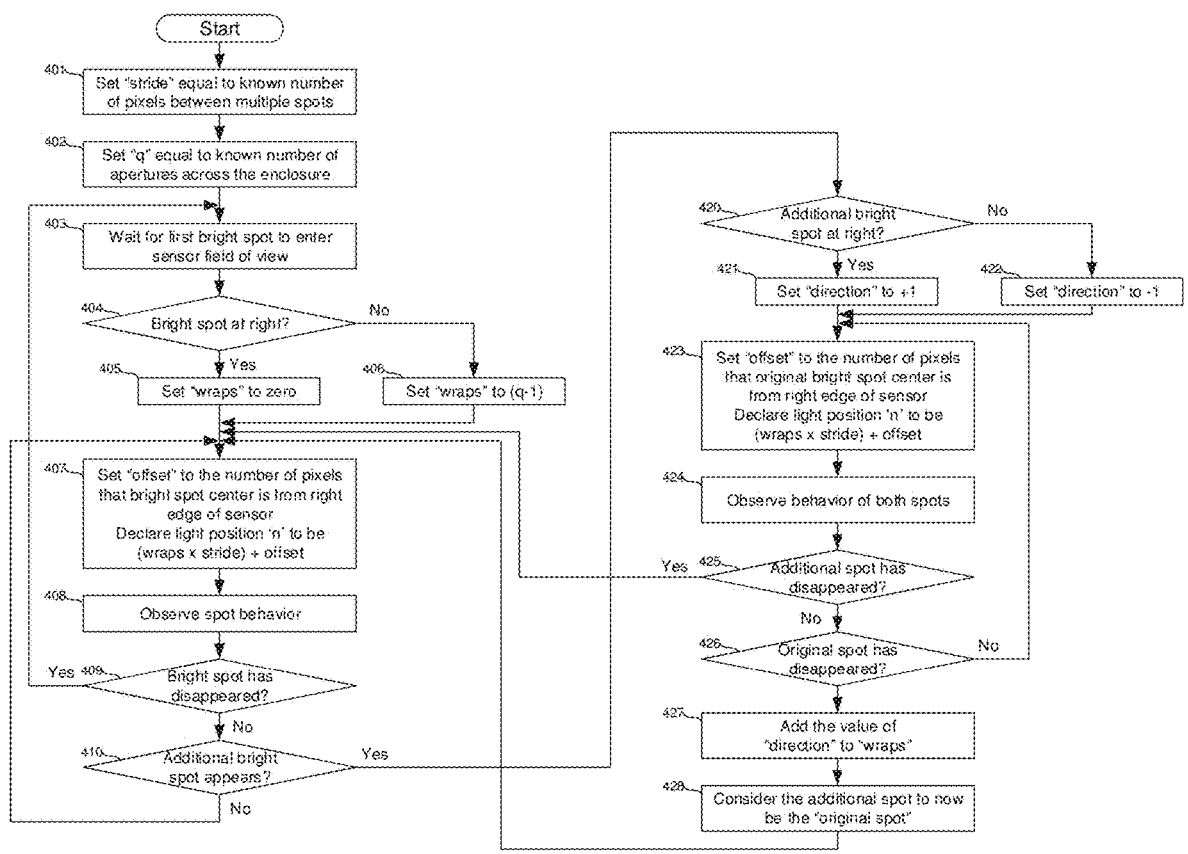
FIG. 18 is a flow chart illustration of a method of tracking bright spots on a sensor having the overlapping regions of FIG. 17.

Reference is now made to FIG. 18, which illustrates a method, implementable by processor 24, for tracking bright spots received through a matrix of apertures; for ease of understanding, FIG. 17 provides the method for a row of apertures. However, the technique may be expanded to two-dimensional and irregularly arranged apertures.

Processor 24 may initially configure (step 401) the "stride" of the device, where the stride is measured when a single light source is lit and is viewed by sensor 63 through multiple apertures. The variable STRIDE may define the distance, defined in pixels on sensor 63, between bright spot positions of neighboring apertures from a sufficiently distant single light source. A bright spot position may be pixel or group of pixels whose intensity values are above a threshold, as described hereinabove.

Processor 24 may further configure (step 402) the number of apertures q in a row of the measuring unit.

In step 403, processor 24 may wait until a first bright spot is identified at sensor 63 (such as by analyzing received data from sensor 63 to determine the position on the sensor 63 of the center of pixels receiving at least a certain level of light). Once this has occurred, processor 24 may determine (step 404) whether this bright spot is at the right-hand-side of sensor 63 (which would be consistent with the light coming into view from the left of the measuring unit). If so, then processor 24 may consider that the spot has not wrapped sensor 63 at all, and thus, may set (step 405) the variable WRAPS to zero. Conversely, if the bright spot has arrived at the left-hand side of sensor 63 (i.e. coming into view from the right of the measuring unit), processor 24 may set (step 406) the variable WRAPS to its maximal value, which may be one less than the number q of apertures.

The variable WRAPS may be used to count the number of times that a bright spot has wrapped sensor 63, as described hereinabove. WRAPS may be increased when the spot moves off the left edge of sensor 63, having been replaced by a spot at the right of sensor 63, and may be decreased when the spot moves off the right edge of sensor 63 having been replaced by a spot at the left of sensor 63. When processor 24 may be counting the movement of a bright spot as a result of a rotation of the measurement device around a vertical central point, the operation of the WRAPS variable may be construed such that an initial rotation in the opposite direction (causing the spot to initially appear at the left side of sensor 63, having arrived via the right-most aperture) may cause the initial count to be set to a maximum known number of WRAPS. In step 407, processor 24 may determine the position of the center of the spot with respect to the right edge of sensor 63, defined in a variable OFFSET, and this position may be used, together with the value of WRAPS, to calculate an overall indication for the POSITION of the spot, which may be calculated to be (WRAPS× STRIDE)+OFFSET.

In step 408, processor 24 may monitor the behavior of the spot. In certain implementations, operation may dwell in step 408 until some change occurs; in other implementations, operation may remain in step 408 only momentarily, such as sufficient time to receive updated information from sensor 63. In step 409, processor 24 may determine if the bright spot has disappeared. If it has, then processor 24 may return to step 403 to await the arrival of a new bright spot. Otherwise, processor 24 may continue to step 410, where processor 24 may determine whether an additional bright spot has appeared. If the processor 24 determines that no such additional bright spot has appeared, processor 24 may return to step 407, and may continue to provide an updated readout of POSITION as the bright spot moves.

If an additional bright spot has appeared, processor 24 may determine (step 420) whether the additional spot has appeared on the right side of sensor 63; if so, a variable DIRECTION, defining the direction of movement of the spots may be set to a value of +1 (to indicate that, should the first spot disappear, the second spot is from the same light source, having wrapped sensor 63 in a positive direction). Otherwise, variable DIRECTION may be set to a value of −1 (i.e. the additional spot appeared on the left of sensor 63).

Processor 24 may calculate (step 423) the variable POSITION of the first spot as WRAPS×STRIDE)+OFFSET, as before and without factoring in the additional spot. Processor 24 may now observe (step 424) the behavior of each of the spots.

In step 425, processor 24 may determine whether the additional spot has disappeared (the additional spot may have appeared if the measuring unit has moved sufficiently for light from a light source to impinge on two apertures, but then the measuring unit may move back towards its original location, in which case, the corresponding light would then only impinge on the original aperture). If so, then processor 24 may return to step 407.

Otherwise, if the additional spot has not disappeared, processor 24 may determine (step 426) if the original spot has disappeared. If not, then processor 24 may return to step 423 to report the POSITION. If the original spot has disappeared, then the additional spot is the only spot left and thus, processor 24 may add the value of the variable DIRECTION to the value of the variable WRAPS and may, in step 428, consider the "additional spot" to now be the "original spot". Processor 24 may return to step 407 where the new "original spot" may be tracked as per the earlier "original spot".

It will be appreciated that the method of FIG. 18 may be extended to handle an array of apertures in more than one dimension, such as array of pinholes 317 (FIG. 14). The variables described hereinabove may extend in multiple directions. Thus, an "original spot" may have an "additional spot" in the X-direction and also an "additional spot" in the Y-direction, with the possible of a further "additional spot"

with an offset in both the X-direction and the Y-direction. The method may also be extended to handle arrays of apertures that may be some combination of multi-dimensional, asymmetrical, non-grid, non-regular, and other arrangements.

It will be appreciated that measuring units having multiple apertures, such as units 310 and 320, may be useful for tracking the motion of bright spots on sensor 63. Moreover, the method of FIG. 18 may enable processor 24 to precisely position a light source by measuring the position at which light from that light source strikes an image sensor. For a measuring unit with multiple apertures, the method of FIG. 18 may allow light from the light source to be continuously tracked despite wrapping the sensor multiple times as it moves. This technique may provide a multiplication of the number of effective pixels of the sensor such that it may function at this task with similar resolution and accuracy to that of a sensor with several times the number of sensor pixels, potentially in each of multiple dimensions. This may allow a small sensor with a resolution of say 500 by 500 pixels to provide position information of a light source with the same resolution and accuracy as a sensor with resolution of say 3000 by 3000 pixels.

It will also be appreciated that the method of FIG. 18 may be relatively simple to perform, thereby providing very fast tracking of the position of bright spots formed by light received from stationary light bulb 46.

Figure 19:
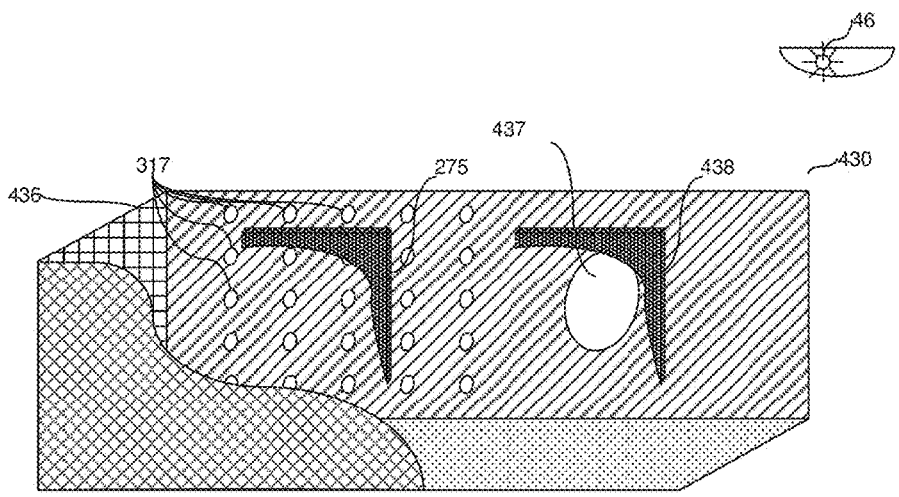
FIG. 19 is an alternative embodiment of the measurement unit of FIG. 14 having two optical arrangements, a matrix array and a standard lens, and two sensors.

Reference is now made to FIG. 19, which illustrates a dual sensor measuring unit 430, comprising a dual sensor enclosure 436, array of pinholes 317 and its 2D image sensor 275, a wide-angle lens element 437, an additional 2D image sensor 438. The arrangement of dual sensor measuring unit 430 may be such as to permit a wide-angle, non-overlapping exposure of an image to be captured at additional 2D image sensor 438, while at the same time allowing the capture of image through array of pinholes 317, as described hereinabove.

Figure 20:
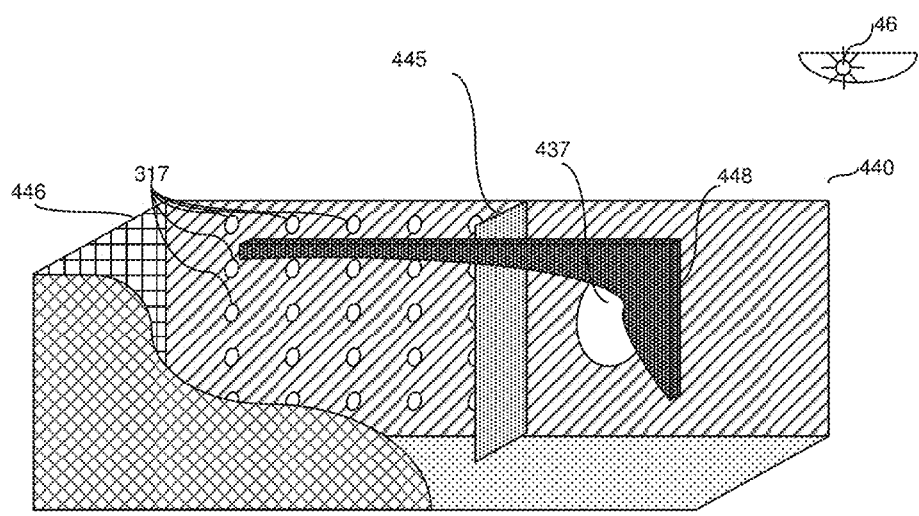
FIG. 20 is an alternative embodiment of the measurement unit of FIG. 19 having a single sensor and barriers between the optical arrangements.

In an alternative embodiment, shown in FIG. 20 to which reference is now made, a unified sensor measuring unit 440 comprises a unified sensor enclosure 446 (which may include a barrier 445), and a unified sensor 448. The function of unified sensor 448 may be to replace 2D image sensor 275 and additional 2D image sensor 438 of FIG. 19 so as to remove errors due to mechanical alignment.

Figure 21A:
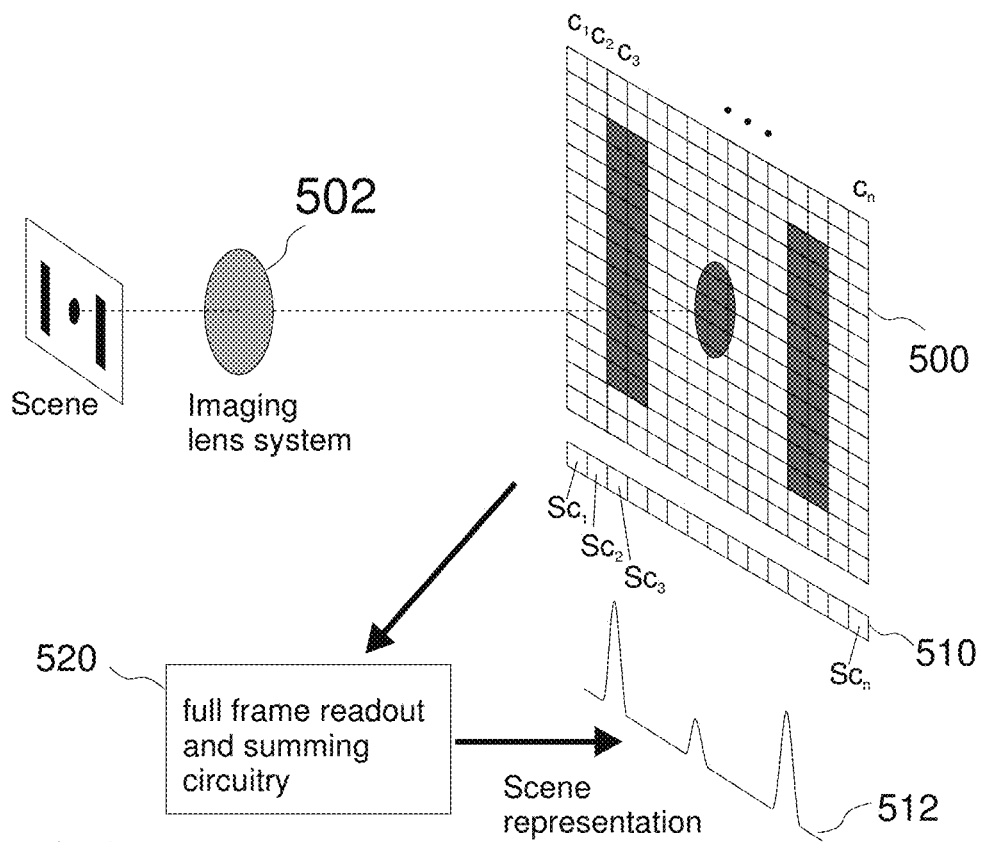
FIG. 21A is an alternative embodiment of the measuring unit of FIG. 4 using summing circuitry with a two-dimensional sensor.
Figure 21B:
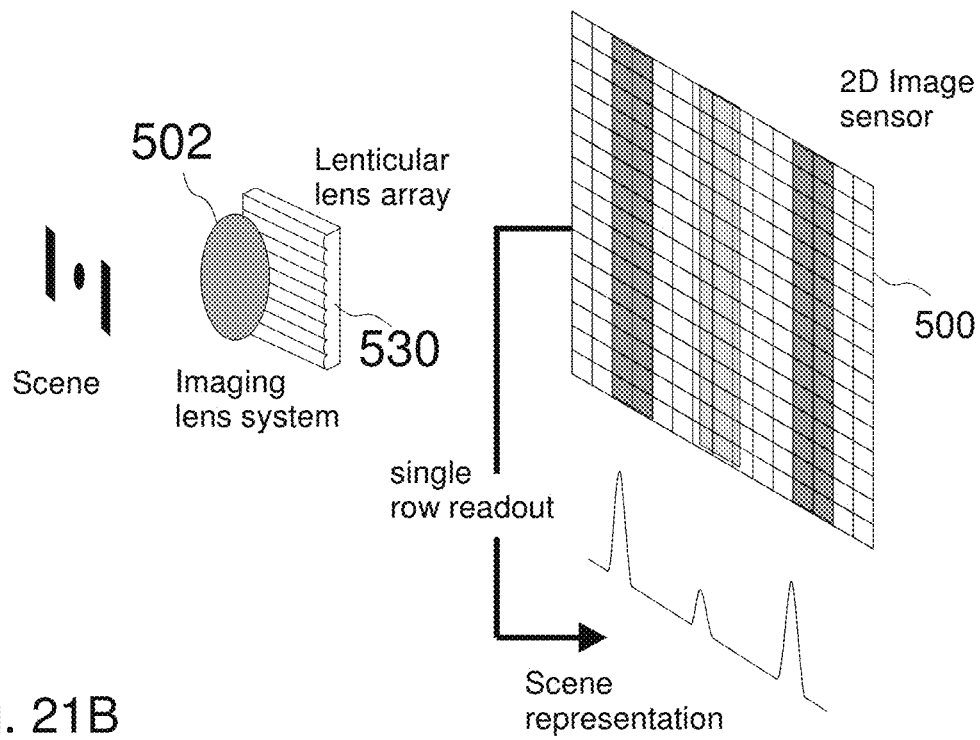
FIG. 21B is an alternative embodiment of the system of FIG. 21A using a lenticular array to provide optical summing.
Figure 22:
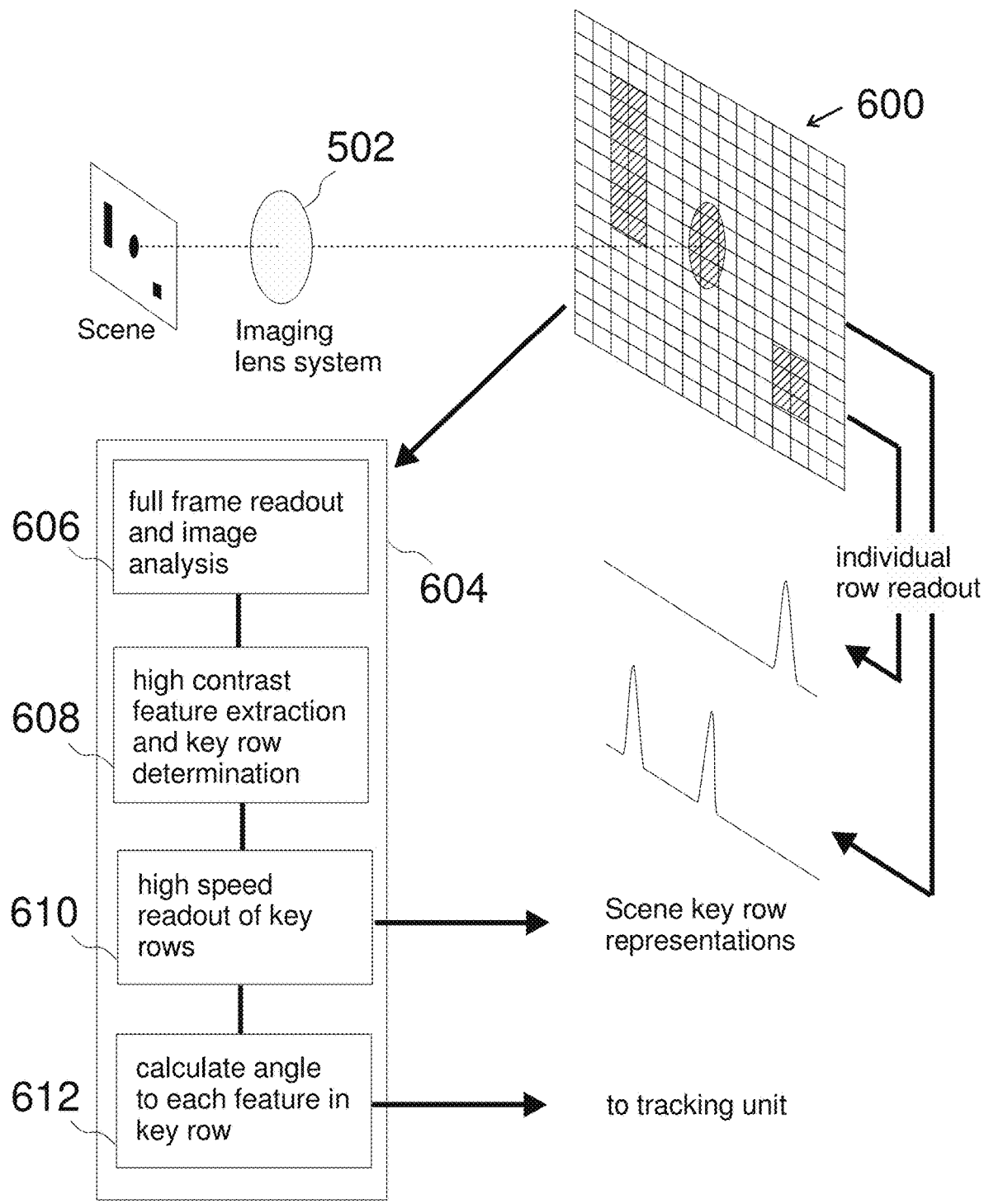
FIG. 22 is an alternative embodiment of the system of FIG. 21A using key row determination.

Reference is now made to FIGS. 21A, 21B and 22 which may provide alternative systems with high directional sensitivity along a first axis and with low directional sensitivity along a second axis.

FIG. 21A illustrates how a conventional imaging system may be used to generate a one-dimensional representation of an image scene by simply summing, with a full frame readout and summing circuitry 520, all of the pixels in each column Ci of a 2D image sensor 500 to obtain a single sum vector 510 storing the sums SCi of each column. Such a representation is particularly useful if, as discussed hereinabove, the scene contains vertical features which will be enhanced by the summing Likewise, bright light sources, by virtue of being significantly brighter than objects in their surrounding area, may remain identifiable despite the summing action. This operation is bandwidth and computationally intensive, however, as the entire image matrix must be read out and summed.

FIG. 21A shows a conventional imaging system with an arbitrary scene (represented in this case by two vertical features and a circular feature), imaged through a conventional imaging system 502 onto 2D image sensor 500. Circuitry 520 may process the frame output of sensor 500 to sum all the pixel values in each column of the sensor to output a single vector representation of the entire scene. Elements of this vector (e.g. peaks, valleys, edges, etc. in the scene representation 512) may correspond to various illumination elements or vertical features of the imaged scene and may be used to track the movement of the sensor with respect to an environment. Thus, the combination of image sensor 500 and circuitry 520 may be a linearly configured imaging sensor.

Image sensor 500 may be a 2D image sensor with a high-speed windowing readout capability (where one or more lines can be read out at significantly higher frame rate). With this type of sensor, the functionality of a high-speed linear sensor can be emulated with standard 2D sensor.

The same information as derived by the summing circuity of circuitry 520 may be obtained at a fraction of the computational time by optically compressing the image along one axis, as shown in FIG. 21B, to which reference is now briefly made. In this embodiment, a lenticular lens array 530 may be placed after imaging lens system 502. Such a selectively dispersive element may be fabricated as a series of small cylindrical lenses in a lenticular lens array format. Small, thin lenticular arrays exist which can give a very large dispersion in one axis with minimal effect on the image transmission along the perpendicular axis. Alternatively, the lenticular element may consist of a directional light shaping diffusing film, such as that manufactured by Luminit LLC of Torrance, Calif.

Lens array 530 may optically spread the image along a first axis, such as a column or group of columns of sensor 500, while maintaining the optical focus along the second axis, such as along a row or group of rows, of sensor 500. In this case, each pixel of 2D sensor 500 will each contain information along a line above and below the pixel in the original 2D scene and a readout of a single row may produce substantially the same signal as in the embodiment of FIG. 21A. Such optical pre-processing of the image may be considered a compression of the original image and may reduce the computational power required by up to several orders of magnitude.

Note that directionally dispersive element 530 may be positioned in front of imaging lens system 502 rather than behind it. It is further noted that directionally dispersive element 530 may be configured to be selectively inserted and removed from the optical imaging path by a mechanism (not shown but known in the art such as with switchable infra-red filters) in order to use a single imaging system to both capture full field images and, when desired, as a position tracking system.

The same approach may be employed to track horizontal features by positioning the sensing system appropriately. Likewise, a sensor providing column readout could be constructed and the rows summed.

By optically spreading the image across the sensor as described above and using rolling shutter exposure techniques, it may also be possible to obtain significantly higher temporal resolution than the underlying frame rate. With a rolling shutter, each line of the image sensor may be exposed during a different part of the frame and, since the entire 2D image may be spread across the entire sensor, each line of the image represents a different time slice of the exposure. Thus, it may be possible to obtain very high-speed tracking readout using a simple CMOS sensor even without high speed windowing capability.

Many prior art 2D image sensors incorporate a windowing functionality whereby a reduced number of lines may be read out at an increased speed. By appropriate use of such a sensor, it is possible to obtain improved tracking without sacrificing the advantages that a 2D image sensor provides and without requiring custom optics.

In a preferred embodiment of the present invention, shown schematically in FIG. 22, a CMOS camera 600, which can selectively readout individual rows (such as the MT9M413, commercially available from Micron Technology INC), is employed together with imaging system 502.

Imaging system 502 may image a scene onto camera 600, which, in turn, may read out a first frame to be sent to a processor 604. The full frame readout of the entire image typically takes tens of milliseconds. Processor 604 may analyze (step 606) the full image and may identify (step 608) one or more regions with high horizontal contrast. Step 608 may involve high contrast feature extraction and determine one or more key rows as those having high contrast features.

Processor 604 may then direct sensor 600 to only output (step 610) the selected rows containing the high contrast features (whether bright spots or high contrast vertical objects). Since the amount of data being readout from sensor 600 is now vastly reduced, the selected rows may be continuously read out at very high speed, typically tens or hundreds of microseconds. Processor 604 may then process this reduced amount of data very quickly and may identify any movement of a contrast feature along a row to determine the change in position and/or orientation of the system containing sensor 600. Processor 604 may calculate (step 612) the angle, for example, relative to the normal of the sensor 600, of the position of each feature in each key row.

Processor 604 may also read out one or more rows above and/or below the selected row and may provide this information to position processor 24 for tracking possible vertical movement of the contrast feature in the image plane. Furthermore, processor 604 may pause the individual row readout and high-speed tracking to acquire a new full frame image, either at fixed intervals or whenever changes in the tracked feature indicate. This mixed-use mode may allow a single camera 600 to provide both the slow 2D mapping functionality and the high speed 1D tracking.

It will be appreciated that, as shown in FIG. 17, the present invention may image multiple points of space onto a single pixel or area of an imaging sensor (either a one-dimensional or a two-dimensional sensor). This may provide a compression of spatial data via superposition. The present invention may be configured to image bright light sources, which may not only reduce the sensitivity required of the sensor, it may also generate a sparse array (i.e. relatively few pixels are active at a time). This may provide benefits in terms of system cost, speed, and power, as has already been described.

It will also be appreciated that the imaging sensors described herein may be "linearly configured" in that they generate a single line of image data, whether as linear image sensors or as 2D image sensors with high speed, vertical summing abilities.

It will also be appreciated that, with an appropriately-chosen optical configuration, if a light source appears to move a small amount (for example by virtue of the rotation of the measuring unit), the associated bright spot may move significantly on the sensor, making the present invention very sensitive to small motions of the measuring unit.

It will also be noted that, although the preceding descriptions have referred to a single light source, such as light source 46, the approach may be extended to the case of multiple light sources and to light sources that may be of different and larger shapes, such as fluorescent light tubes or sunlight passing through a window. It may be considered that the preceding descriptions have been kept simple as an aid to understanding yet may be extended to include a wide variety of situations and applications.

It will be noted that whereas the aperture may have been described as "an aperture", "a pinhole aperture", and so forth, it also includes the use of a lens, and indeed to include other forms of restriction to the passing light beams.

As an aid to understanding, the diagrams presented have shown the apertures formed as part of a flat surface, such as may have been drilled through a wall of the enclosure. It will be clear that apertures may be formed by many other techniques, for example by mark of metal vapor deposition on a transparent surface. It will also be clear that in many cases the surface that embodies the apertures may not be flat, and may be a shape such as cylindrical, spherical, aspheric, and so forth. Likewise, the arrangement of apertures, may be such that apertures present in a surface of one shape may function as if they had been apertures present in a surface of a different shape; for example, apertures formed by GRIN lenses of varying lengths embedded into a flat surface may function similar to apertures formed by GRIN lenses of identical lengths embedded into a curved surface.

It will be appreciated that indoor positioning system 20 may be applied in a range of other technological fields that may benefit from high-speed positioning.

For example, system 20 may be useful for a domestic robot that is required to navigate rapidly, accurately, and smoothly through a domestic space. Such a robot may be a cleaning device, a food delivery device, and so forth. System 20 may be mounted on the robot and may enable the robot to navigate successfully through an apartment without requiring the installation of dedicated beacons.

Alternatively, system 20 may be mounted on an indoor drone. While outdoor drones generally have a wide operating area and access to satellite GPS signals, indoor drones are required to operate to greater accuracy and may not have access to these signals. System 20 may provide a low-cost, low-power, lightweight solution to indoor drone positioning whilst avoiding an excessive processing workload.

System 20 may also be used for toys and games that need to determine their position in a fast, accurate, and low-cost manner. Take for example the "Sea Battle" game, as popularized by the Milton Bradley Company under the name "Battleship". A toy may be envisioned whereby the playing area of the game is the floor of a room, and whereby the action of placing ships or sinking enemy ships involves the movement of the game system to the appropriate part of the playing area (i.e. to the appropriate part of the room). System 20 may be mounted onto this toy to allow it to determine its position within the room.

System 20 may alternatively be mounted on a vehicle for automotive navigation, and may be particularly suited to night-time, outdoors operation. For this application, positioning may be on the basis of street lighting forming fixed light sources, allowing the vehicle's position to be rapidly and accurately determined. Additionally, the headlights and taillights of other vehicles may also function as bright light sources, and may thus be tracked as additional light-emitting objects, as discussed hereinabove.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A positioning unit mountable on a moving object, the unit comprising:
   at least one light source measuring unit having high directional sensitivity along a first axis and low directional sensitivity along a second axis orthogonal to said first axis to capture images of a plurality of simultaneously active stationary light sources located at multiple locations in a space as said moving object moves with respect to said light sources; and
   a processor to determine relative angular information of said moving object with respect to said light sources at least from the image output of said at least one light source measuring unit, wherein each said light source measuring unit comprises:
   an imaging sensor having at least a single one-dimensional line of pixels aligned along said first axis; and
   an optical arrangement causing light from said stationary light sources to simultaneously fall on said one-dimensional line of pixels.

2. The unit of claim 1, wherein said moving object is a human head, said unit is implemented on a headset and said processor to determine at least one axis of orientation of said headset.

3. The unit of claim 1 and also comprising at least one of: an accelerometer, a gyroscope, and a magnetometer providing input into said processor.

4. The unit of claim 1 wherein said stationary light sources comprises at least one of: a light bulb, daylight through a window, a lamp, an LED and an infra-red light source.

5. The unit of claim 1 wherein said optical arrangement has said high directional sensitivity along said first axis and said low directional sensitivity along said second axis.

6. The unit of claim 5 wherein said optical arrangement comprises:
   an enclosure for said imaging sensor, said enclosure having at least one slit in one wall thereof, said sensor being mounted opposite to said at least one slit and receiving light therefrom.

7. The unit of claim 6 wherein said one wall is curved and said at least one slit is formed within said curved wall.

8. The unit of claim 6 wherein said at least one slit is three slits.

9. The unit of claim 6 wherein at least one of said at least one slit is formed on an angle to a symmetrical axis of said sensor.

10. The unit of claim 6 wherein said optical arrangement also comprises a lens incorporated into at least one of said at least one slits.

11. The unit of claim 1 wherein said moving object is one of: a robot, a drone, a toy and a vehicle.

12. The unit of claim 1 wherein said imaging sensor is one of: a linear sensor and a two-dimensional sensor.

13. The unit according to claim 1 and wherein said imaging sensor has low sensitivity to received light.

14. The unit according to claim 13, said processor to track bright spots on said imaging sensor related to said stationary light sources.

15. The unit according to claim 13, said processor to track peaks in output of said imaging sensor related to vertical features in said space.

16. The unit according to claim 1 wherein said imaging sensor is a two-dimensional image sensor having rows and columns of image cells and said measuring unit comprises:
   a summing unit to generate summed columns of said imaging sensor to generate a representation of said scene having said high directional sensitivity along said first axis and said low directional sensitivity along said second axis.

17. The unit of claim 16 and wherein said summing unit is a full frame readout and summing circuitry to sum columns of said imaging sensor.

18. The unit of claim 1 wherein said imaging sensor comprises a two-dimensional image sensor having rows and columns of image cells and a key row analyzer to select rows of said sensor having high contrast.

19. The unit of claim 18 wherein said key row analyzer comprises:
   a high contrast feature extractor to determine high contrast features of said scene;
   a key row determiner to determine key rows, said key rows having said high contrast features; and
   a key row readout unit to readout said key rows as said scene representation.

20. The unit of claim 1 wherein said processor comprises:
a determiner to determine that at least two spatially separated pixels on said sensor are receiving light from at least two bright light sources; and
a disambiguator to disambiguate said at least two pixels in at least one sensor direction, said disambiguator comprising:
a correlator to determine correlations among said light receiving pixels of said sensors; and
a selector to use said correlations to determine which pixels are receiving light from the same bright light source.

21. The unit of claim 1 wherein said processor comprises means to generate positioning information of said moving object from said relative angular information.

22. The unit of claim 21, said unit implemented on a headset and said processor to determine position of said headset.

23. The unit of claim 21 wherein said processor comprises means to output said positioning information to a simultaneous localization and mapping (SLAM) unit.

24. A positioning unit mountable on a moving object, the unit comprising:
at least one light source measuring unit to capture images of a plurality of simultaneously active stationary light sources located at multiple locations; wherein each said light source measuring unit comprises:
an optical arrangement having a matrix of apertures and producing therefrom multiple overlapped images of a scene; and
an imaging sensor to receive light from said stationary light sources through said optical arrangement; and
a processor to determine relative angular information of said moving object at least by disambiguating said overlapped images of said scene.

25. The unit of claim 24 wherein said means are sensitive to small motions of each said measuring unit.

26. The unit of claim 24 wherein said imaging sensor is configured to generate a sparse array of active pixels at a time.

27. The unit of claim 24 wherein said processor comprises means to generate positioning information of said moving object from said relative angular information.

28. A method for determining the position of a moving object, the method comprising:
at least one light source measuring unit on said moving object capturing images of a plurality of simultaneously active stationary light sources located at multiple locations in a space as said moving object moves with respect to said light sources, each said measuring unit having high directional sensitivity along a first axis and low directional sensitivity along a second axis orthogonal to said first axis;
having an imaging sensor with at least a single one-dimensional line of pixels;
linearly aligning said imaging sensor along said first axis to receive light from said stationary light sources through an optical arrangement which causes light from said stationary light sources to simultaneously fall on said one-dimensional line of pixels; and
determining relative angular information of said moving object with respect to said light sources at least from the output of said at least one light source measuring unit.

29. The method according to claim 28 and wherein said determining comprises tracking bright spots on said imaging sensor related to said stationary light sources.

30. The method according to claim 28 and wherein said determining comprises tracking peaks in output of said imaging sensor related to vertical features in said space.

31. The method according to claim 28 and wherein said capturing comprises optically compressing said second axis.

32. The method according to claim 28 wherein said imaging sensor is a two-dimensional image sensor having rows and columns of image cells and said determining comprises summing columns of said imaging sensor to generate an image of said scene.

33. The method of claim 28 wherein said moving object is one of: a robot, a drone, a toy and a vehicle.

34. The method of claim 28 wherein said determining comprises:
determining that at least two spatially separated pixels on said sensor are receiving light from at least two bright light sources;
disambiguating said at least two pixels in at least one sensor direction, said disambiguating comprising:
determining correlations among said light receiving pixels of said sensors; and
using said correlations to determine which pixels are receiving light from the same bright light source.

35. The method of claim 28 wherein said determining comprises generating positioning information of said moving object from said relative angular information.

36. The method according to claim 35 wherein said moving object is a human head and wherein said positioning information is provided to a virtual reality system.

* * * * *